(12) United States Patent
Hernandez De La Bastida et al.

(10) Patent No.: US 12,486,741 B2
(45) Date of Patent: Dec. 2, 2025

(54) WELLSITE EQUIPMENT CONTROLLER

(71) Applicant: Schlumberger Technology Corporation, Sugar Land, TX (US)

(72) Inventors: Miguel Hernandez De La Bastida, Sugar Land, TX (US); Antonio Massoni Abinader, Houston, TX (US); Agustin Gambaretto, Houston, TX (US); Garud Sridhar, London (GB)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 67 days.

(21) Appl. No.: 18/573,477

(22) PCT Filed: Jun. 30, 2022

(86) PCT No.: PCT/US2022/035788
§ 371 (c)(1),
(2) Date: Dec. 22, 2023

(87) PCT Pub. No.: WO2023/278745
PCT Pub. Date: Jan. 5, 2023

(65) Prior Publication Data
US 2024/0295164 A1  Sep. 5, 2024

Related U.S. Application Data

(60) Provisional application No. 63/218,180, filed on Jul. 2, 2021.

(51) Int. Cl.
*E21B 41/00* (2006.01)
*E21B 43/12* (2006.01)
*E21B 47/07* (2012.01)

(52) U.S. Cl.
CPC .......... *E21B 43/128* (2013.01); *E21B 47/07* (2020.05)

(58) Field of Classification Search
None
See application file for complete search history.

(56) References Cited

U.S. PATENT DOCUMENTS 10,353,358 B2  7/2019  Tunc et al.
2008/0109490 A1  5/2008  Arnegaard et al.
(Continued)

FOREIGN PATENT DOCUMENTS

| EP | 2785969 B1 | 6/2017 | |
| WO | 2007060446 A1 | 5/2007 | |
| WO | WO-2020097060 A2 * | 5/2020 | ............. E21B 43/26 |

OTHER PUBLICATIONS

Deng, L. et al., "Real-time Electrical Submersive Pump Smart Alarms Suite Enabed Through Data Analytics and Edge-based Virtual Flowmeter", SPE-209958-MS, prepared for presentation at the 2022 SPE Annual Technical Conference and Exhibition held in Houston, Texas, USA, 2022, 9 pages.
(Continued)

*Primary Examiner* — Curtis A Kuntz
*Assistant Examiner* — Jerold B Murphy
(74) *Attorney, Agent, or Firm* — Jeffrey D. Frantz

(57) ABSTRACT

An equipment controller can include a processor; memory accessible to the processor; and processor-executable instructions stored in the memory to instruct the equipment controller to: instantiate an edge application and an edge framework, where the edge framework includes a framework engine; receive sensor data; process the sensor data via the edge application to issue a call to the edge framework; responsive to the call, implement the framework engine to
(Continued)

generate a result; and based at least in part on the result, issue an equipment control signal.

20 Claims, 19 Drawing Sheets

(56) References Cited

U.S. PATENT DOCUMENTS

| | | |
|---|---|---|
| 2010/0044033 A1 | 2/2010 | Menon et al. |
| 2013/0175030 A1* | 7/2013 | Ige .................. G05B 15/02 |
| | | 700/282 |
| 2020/0202056 A1* | 6/2020 | Samson ............... G01V 1/307 |
| 2022/0381934 A1* | 12/2022 | Thompson .............. E21B 43/26 |
| 2023/0399938 A1 | 12/2023 | Hernandez De La Bastida et al. |

OTHER PUBLICATIONS

Sharma, A. et al., "Edge Computing: Continuous Surveillance and Management of Production Operations in a Cost Effective Manner", SPE-201411-MS, presented virtually at the SPE Annual Technical Conference & Exhibition, 2020, 9 pages.

Search Report and Written Opinion of International Patent Application No. PCT/US2022/035788 Dated Oct. 21, 2022, 8 Pages.

* cited by examiner

Real-time production loss detection
Real-time production back allocation
Chemical injection rate calculation (e.g., corrosion, scale, demulsifier, solvents, etc.)
Early detection of flow assurance issue(s) (e.g., tubing leaks, scale, etc.) when combined with PI VFM VFM solution for non ESP applications
Real-time production loss detection
Real-time production back allocation
Chemical injection rate calculation (e.g., corrosion, scale, demulsifier, solvents, etc.)
Early detection of flow assurance issue(s) (e.g., tubing leaks, scale, etc.) when combined with ESP VFM
Liquid unloading for gas wells Detection of emulsion conditions on one or more points of a production system where pressure and temperature available
Pump on demand control for chemical treatment injection

ID BISWELLSITE EQUIPMENT CONTROLLER

CROSS-REFERENCE TO RELATED APPLICATION(S)

The present disclosure is a National Stage Entry of International Application No. PCT/US2022/035788, filed Jun. 30, 2022, which claims priority from U.S. Provisional Patent Appl. No. 63/218,180, filed on Jul. 2, 2021, entitled "WELLSITE EQUIPMENT CONTROLLER," which are entirely incorporated herein by reference.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.). Various operations may be performed in the field to access such hydrocarbon fluids and/or produce such hydrocarbon fluids. For example, consider equipment operations where equipment may be controlled to perform one or more operations.

SUMMARY

An equipment controller can include a processor; memory accessible to the processor; and processor-executable instructions stored in the memory to instruct the equipment controller to: instantiate an edge application and an edge framework, where the edge framework includes a framework engine; receive sensor data; process the sensor data via the edge application to issue a call to the edge framework; responsive to the call, implement the framework engine to generate a result; and based at least in part on the result, issue an equipment control signal. A method can include instantiating an edge application and an edge framework, where the edge framework includes a framework engine; receiving sensor data; processing the sensor data via the application to issue a call to the framework; responsive to the call, implementing the framework engine to generate a result; and, based at least in part on the result, issuing an equipment control signal. One or more computer-readable storage media can include processor-executable instructions to instruct a computing system to: instantiate an edge application and an edge framework, where the edge framework includes a framework engine; receive sensor data; process the sensor data via the application to issue a call to the framework; responsive to the call, implement the framework engine to generate a result; and, based at least in part on the result, issue an equipment control signal. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

DETAILED DESCRIPTION

This description is not to be taken in a limiting sense, but rather is made merely for the purpose of describing the general principles of the implementations. The scope of the described implementations should be ascertained with reference to the issued claims.

Figure 1:
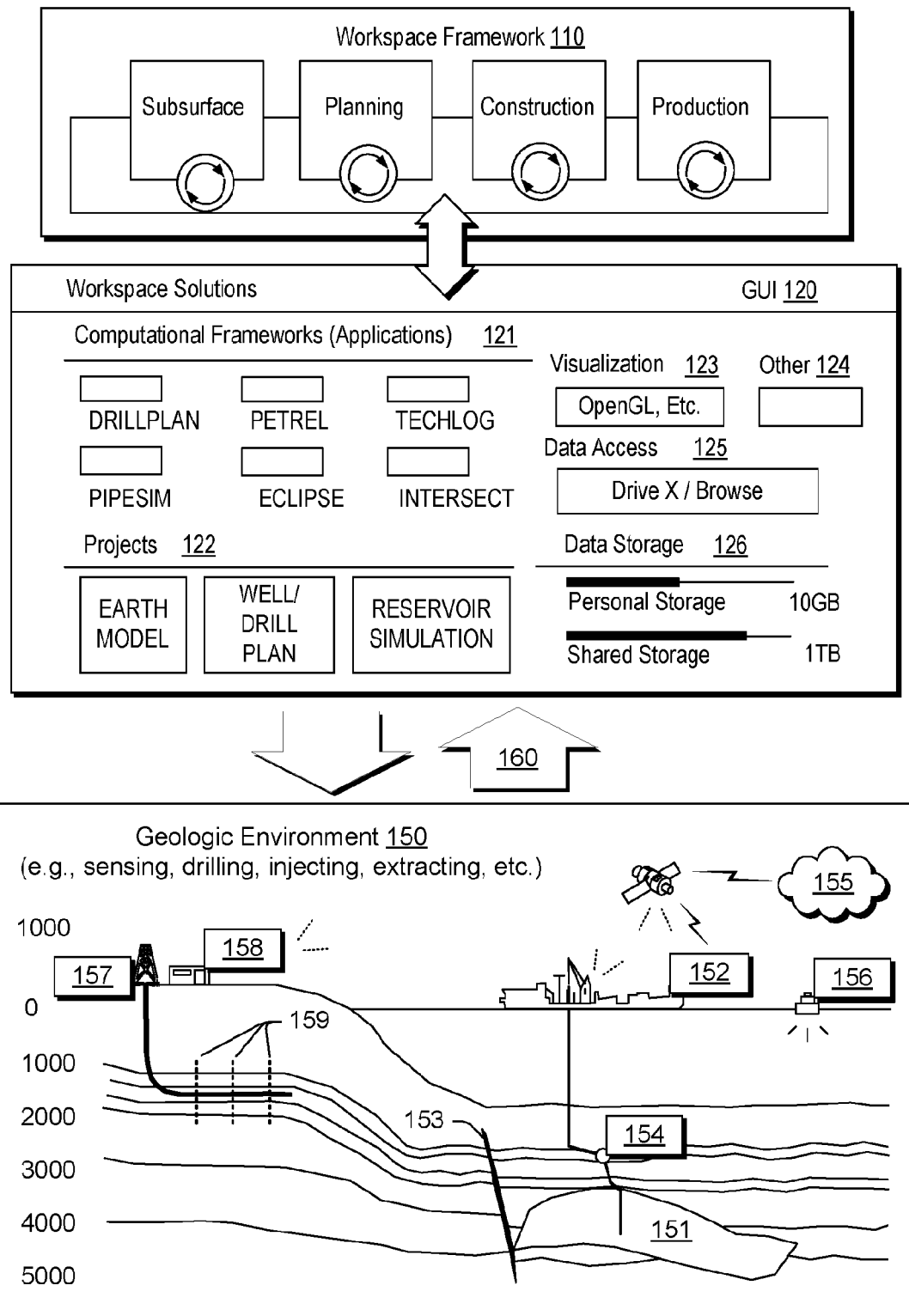
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows some examples of computational frameworks, including the DRILLPLAN, PETREL, TECHLOG, PIPESIM, ECLIPSE, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework can be part of the DELFI cognitive E&P environment (Schlumberger Limited, Houston, Texas) for utilization in geosciences and geoengineering, for example, to analyze subsurface data from exploration to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal FOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The aforementioned DELFI environment provides various features for workflows as to subsurface analysis, planning, construction, and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages. Examples of such software packages include the PETREL framework. As an example, a system or systems may utilize a framework such as the DELFI framework (Schlumberger Limited, Houston, Texas). Such a framework may operatively couple various other frameworks to provide for a multi-framework workspace. As an example, the GUI 120 of FIG. 1 may be a GUI of the DELFI framework.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1 D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where later acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different production scenarios to find an optimal one before production or further production occurs. A reservoir simulator will not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas) or the PETROMOD simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

As mentioned, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, etc.).

Figure 2:
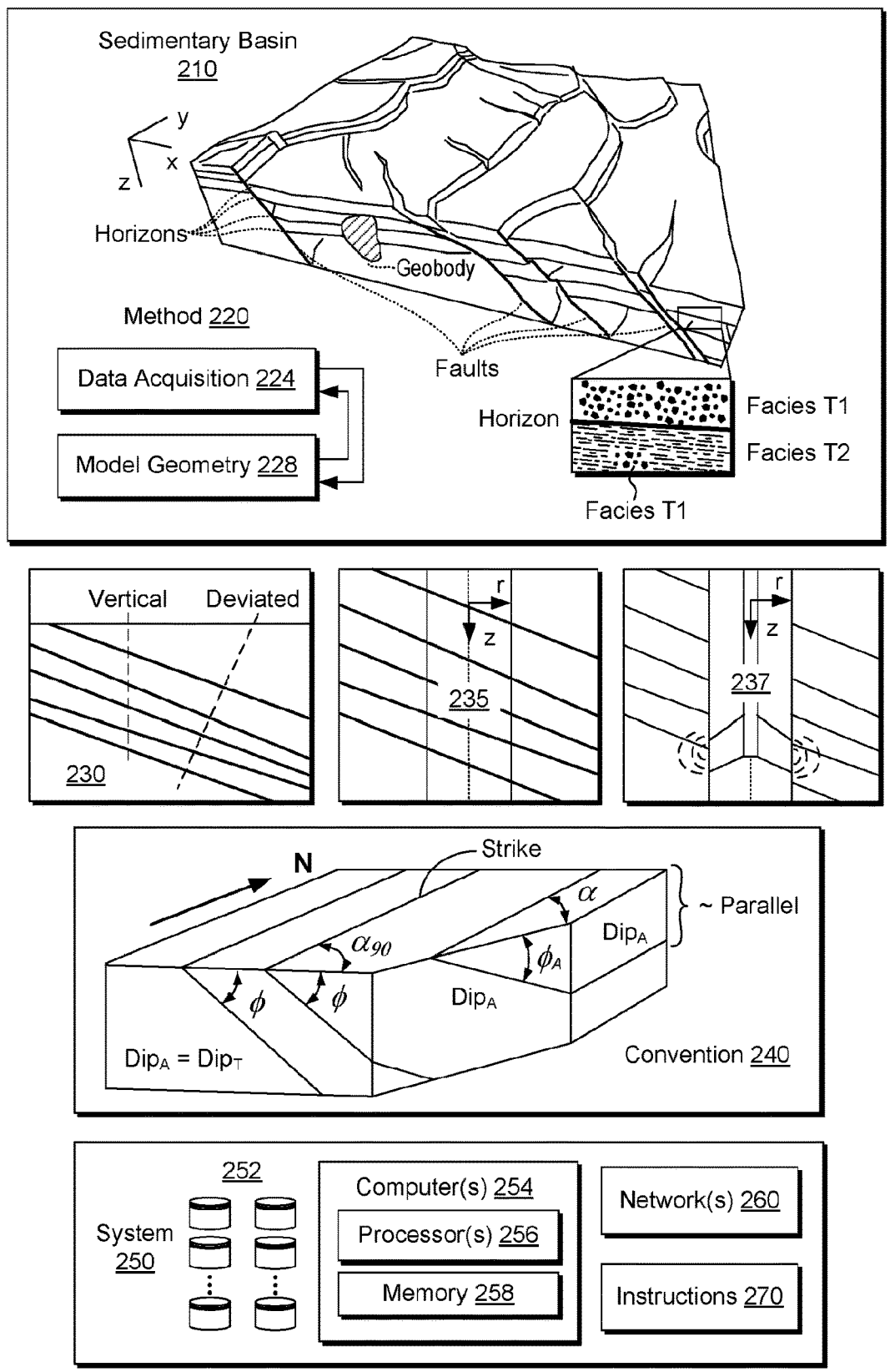
FIG. 2 illustrates examples of a basin, a convention and a system.

FIG. 2 shows an example of a sedimentary basin 210 (e.g., a geologic environment), an example of a method 220 for model building (e.g., for a simulator, etc.), an example of a formation 230, an example of a borehole 235 in a formation, an example of a convention 240 and an example of a system 250.

As an example, data acquisition, reservoir simulation, petroleum systems modeling, etc. may be applied to characterize various types of subsurface environments, including environments such as those of FIG. 1.

In FIG. 2, the sedimentary basin 210, which is a geologic environment, includes horizons, faults, one or more geobodies and facies formed over some period of geologic time. These features are distributed in two or three dimensions in space, for example, with respect to a Cartesian coordinate system (e.g., x, y and z) or other coordinate system (e.g., cylindrical, spherical, etc.). As shown, the model building method 220 includes a data acquisition block 224 and a model geometry block 228. Some data may be involved in building an initial model and, thereafter, the model may optionally be updated in response to model output, changes in time, physical phenomena, additional data, etc. As an example, data for modeling may include one or more of the following: depth or thickness maps and fault geometries and timing from seismic, remote-sensing, electromagnetic, gravity, outcrop and well log data. Furthermore, data may include depth and thickness maps stemming from facies variations (e.g., due to seismic unconformities) assumed to following geological events ("iso" times) and data may include lateral facies variations (e.g., due to lateral variation in sedimentation characteristics).

To proceed to modeling of geological processes, data may be provided, for example, data such as geochemical data (e.g., temperature, kerogen type, organic richness, etc.), timing data (e.g., from paleontology, radiometric dating, magnetic reversals, rock and fluid properties, etc.) and boundary condition data (e.g., heat-flow history, surface temperature, paleowater depth, etc.).

In basin and petroleum systems modeling, quantities such as temperature, pressure and porosity distributions within the sediments may be modeled, for example, by solving partial differential equations (PDEs) using one or more numerical techniques. Modeling may also model geometry with respect to time, for example, to account for changes stemming from geological events (e.g., deposition of material, erosion of material, shifting of material, etc.).

As shown in FIG. 2, the formation 230 includes a horizontal surface and various subsurface layers. As an example, a borehole may be vertical. As another example, a borehole may be deviated. In the example of FIG. 2, the borehole 235 may be considered a vertical borehole, for example, where the z-axis extends downwardly normal to the horizontal surface of the formation 230. As an example, a tool 237 may be positioned in a borehole, for example, to acquire information. As mentioned, a borehole tool can include one or more sensors that can acquire borehole images via one or more imaging techniques. A data acquisition sequence for such a tool can include running the tool into a borehole with acquisition pads closed, opening, and pressing the pads against a wall of the borehole, delivering electrical current into the material defining the borehole while translating the tool in the borehole, and sensing current remotely, which is altered by interactions with the material.

As an example, data can include geochemical data. For example, consider data acquired using X-ray fluorescence (XRF) technology, Fourier transform infrared spectroscopy (FTIR) technology and/or wireline geochemical technology.

As an example, one or more probes may be deployed in a bore via a wireline or wirelines. As an example, a probe may emit energy and receive energy where such energy may be analyzed to help determine mineral composition of rock surrounding a bore. As an example, nuclear magnetic resonance may be implemented (e.g., via a wireline, downhole NMR probe, etc.), for example, to acquire data as to nuclear magnetic properties of elements in a formation (e.g., hydrogen, carbon, phosphorous, etc.).

As an example, lithology scanning technology may be employed to acquire and analyze data. For example, consider the LITHO SCANNER technology marketed by Schlumberger Limited (Houston, Texas). As an example, a LITHO SCANNER tool may be a gamma ray spectroscopy tool.

As an example, a tool may be positioned to acquire information in a portion of a borehole. Analysis of such information may reveal vugs, dissolution planes (e.g., dissolution along bedding planes), stress-related features, dip events, etc. As an example, a tool may acquire information that may help to characterize a fractured reservoir, optionally where fractures may be natural and/or artificial (e.g., hydraulic fractures). Such information may assist with completions, stimulation treatment, etc. As an example, information acquired by a tool may be analyzed using a framework such as the aforementioned TECHLOG framework (Schlumberger Limited, Houston, Texas).

As an example, a workflow may utilize one or more types of data for one or more processes (e.g., stratigraphic modeling, basin modeling, completion designs, drilling, production, injection, etc.). As an example, one or more tools may provide data that can be used in a workflow or workflows that may implement one or more frameworks (e.g., PETREL, TECHLOG, PIPESIM, ECLIPSE, etc.).

As to the convention 240 for dip, as shown in FIG. 2, the three-dimensional orientation of a plane can be defined by its dip and strike. Dip is the angle of slope of a plane from a horizontal plane (e.g., an imaginary plane) measured in a vertical plane in a specific direction. Dip may be defined by magnitude (e.g., also known as angle or amount) and azimuth (e.g., also known as direction). As shown in the convention 240 of FIG. 2, various angles ϕ indicate angle of slope downwards, for example, from an imaginary horizontal plane (e.g., flat upper surface); whereas dip refers to the direction towards which a dipping plane slopes (e.g., which may be given with respect to degrees, compass directions, etc.). Another feature shown in the convention of FIG. 2 is strike, which is the orientation of the line created by the intersection of a dipping plane and a horizontal plane (e.g., consider the flat upper surface as being an imaginary horizontal plane).

Some additional terms related to dip and strike may apply to an analysis, for example, depending on circumstances, orientation of collected data, etc. One term is "true dip" (see, e.g., $Dip_T$ in the convention 240 of FIG. 2). True dip is the dip of a plane measured directly perpendicular to strike (see, e.g., line directed northwardly and labeled "strike" and angle $\alpha_{90}$) and also the maximum possible value of dip magnitude. Another term is "apparent dip" (see, e.g., $Dip_A$ in the convention 240 of FIG. 2). Apparent dip may be the dip of a plane as measured in any other direction except in the direction of true dip (see, e.g., $\phi_A$ as $Dip_A$ for angle α); however, it is possible that the apparent dip is equal to the true dip (see, e.g., ϕ as $Dip_A$=$Dip_T$ for angle $\alpha_{90}$ with respect to the strike). In other words, where the term apparent dip is used (e.g., in a method, analysis, algorithm, etc.), for a particular dipping plane, a value for "apparent dip" may be equivalent to the true dip of that particular dipping plane.

As shown in the convention 240 of FIG. 2, the dip of a plane as seen in a cross-section perpendicular to the strike is true dip (see, e.g., the surface with ϕ as $Dip_A$=$Dip_T$ for angle $\alpha_{90}$ with respect to the strike). As indicated, dip observed in a cross-section in any other direction is apparent dip (see, e.g., surfaces labeled $Dip_A$). Further, as shown in the convention 240 of FIG. 2, apparent dip may be approximately 0 degrees (e.g., parallel to a horizontal surface where an edge of a cutting plane runs along a strike direction).

In terms of observing dip in wellbores, true dip is observed in wells drilled vertically. In wells drilled in any other orientation (or deviation), the dips observed are apparent dips (e.g., which are referred to by some as relative dips). In order to determine true dip values for planes observed in such boreholes, as an example, a vector computation (e.g., based on the borehole deviation) may be applied to one or more apparent dip values.

As mentioned, another term that finds use in sedimentological interpretations from borehole images is "relative dip" (e.g., $Dip_R$). A value of true dip measured from borehole images in rocks deposited in very calm environments may be subtracted (e.g., using vector-subtraction) from dips in a sand body. In such an example, the resulting dips are called relative dips and may find use in interpreting sand body orientation.

A convention such as the convention 240 may be used with respect to an analysis, an interpretation, an attribute, etc. As an example, various types of features may be described, in part, by dip (e.g., sedimentary bedding, faults and fractures, cuestas, igneous dikes and sills, metamorphic foliation, etc.). As an example, dip may change spatially as a layer approaches a geobody. For example, consider a salt body that may rise due to various forces (e.g., buoyancy, etc.). In such an example, dip may trend upward as a salt body moves upward.

Seismic interpretation may aim to identify and/or classify one or more subsurface boundaries based at least in part on one or more dip parameters (e.g., angle or magnitude, azimuth, etc.). As an example, various types of features (e.g., sedimentary bedding, faults and fractures, cuestas, igneous dikes and sills, metamorphic foliation, etc.) may be described at least in part by angle, at least in part by azimuth, etc.

As an example, equations may be provided for petroleum expulsion and migration, which may be modeled and simulated, for example, with respect to a period of time. Petroleum migration from a source material (e.g., primary migration or expulsion) may include use of a saturation model where migration-saturation values control expulsion. Determinations as to secondary migration of petroleum (e.g., oil or gas), may include using hydrodynamic potential of fluid and accounting for driving forces that promote fluid flow. Such forces can include buoyancy gradient, pore pressure gradient, and capillary pressure gradient.

As shown in FIG. 2, the system 250 includes one or more information storage devices 252, one or more computers 254, one or more networks 260 and instructions 270. As to the one or more computers 254, each computer may include one or more processors (e.g., or processing cores) 256 and memory 258 for storing instructions, for example, consider the instructions 270 as including instructions executable by at least one of the one or more processors. As an example, a computer may include one or more network interfaces (e.g., wired or wireless), one or more graphics cards (e.g., one or more GPUs, etc.), a display interface (e.g., wired or wireless), etc. As an example, imagery such as surface imagery (e.g., satellite, geological, geophysical, etc.) may be stored, processed, communicated, etc. As an example, data may include SAR data, GPS data, etc. and may be stored, for example, in one or more of the storage devices 252. As an example, the system 250 may be local, remote or in part local and in part remote. As to remote resources, consider one or more cloud-based resources (e.g., as part of a cloud platform, etc.).

As an example, the instructions 270 may include instructions (e.g., stored in memory) executable by one or more processors to instruct the system 250 to perform various actions. As an example, the system 250 may be configured such that the instructions 270 provide for establishing one or more aspects of the workspace framework 110 of FIG. 1. As an example, one or more methods, techniques, etc. may be performed at least in part via instructions, which may be, for example, instructions of the instructions 270 of FIG. 2.

As an example, a framework can include various components. For example, a framework can include one or more components for prediction of reservoir performance, one or more components for optimization of an operation or operations, one or more components for control of production engineering operations, etc. As an example, a framework can include components for prediction of reservoir performance, optimization and control of production engineering operations performed at one or more reservoir wells. Such a framework may, for example, allow for implementation of various methods. For example, consider an approach that allows for a combination of physics-based and data-driven methods for modeling and forecasting a reservoir production.

Figure 3:
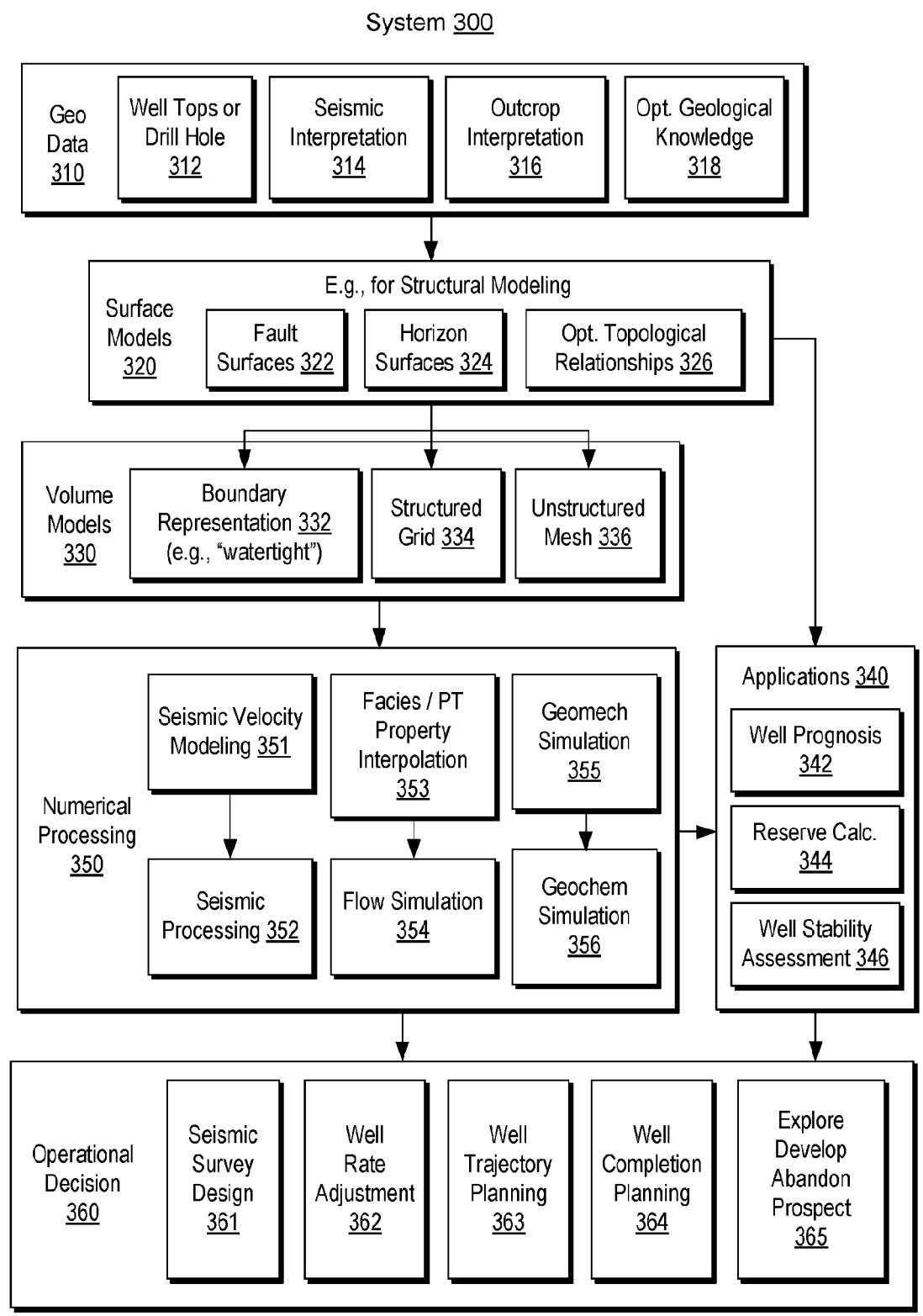
FIG. 3 illustrates an example of a system.

FIG. 3 shows an example of a system 300 that includes a geological/geophysical data block 310, a surface models block 320 (e.g., for one or more structural models), a volume modules block 330, an applications block 340, a numerical processing block 350 and an operational decision block 360. As shown in the example of FIG. 3, the geological/geophysical data block 310 can include data from well tops or drill holes 312, data from seismic interpretation 314, data from outcrop interpretation and optionally data from geological knowledge. As to the surface models block 320, it may provide for creation, editing, etc. of one or more surface models based on, for example, one or more of fault surfaces 322, horizon surfaces 324 and optionally topological relationships 326. As to the volume models block 330, it may provide for creation, editing, etc. of one or more volume models based on, for example, one or more of boundary representations 332 (e.g., to form a watertight model), structured grids 334 and unstructured meshes 336.

As shown in the example of FIG. 3, the system 300 may allow for implementing one or more workflows, for example, where data of the data block 310 are used to create, edit, etc. one or more surface models of the surface models block 320, which may be used to create, edit, etc. one or more volume models of the volume models block 330. As indicated in the example of FIG. 3, the surface models block 320 may provide one or more structural models, which may be input to the applications block 340. For example, such a structural model may be provided to one or more applications, optionally without performing one or more processes of the volume models block 330 (e.g., for purposes of numerical processing by the numerical processing block 350). Accordingly, the system 300 may be suitable for one or more workflows for structural modeling (e.g., optionally without performing numerical processing per the numerical processing block 350).

As to the applications block 340, it may include applications such as a well prognosis application 342, a reserve calculation application 344 and a well stability assessment application 346. As to the numerical processing block 350, it may include a process for seismic velocity modeling 351 followed by seismic processing 352, a process for facies and petrophysical property interpolation 353 followed by flow simulation 354, and a process for geomechanical simulation 355 followed by geochemical simulation 356. As indicated, as an example, a workflow may proceed from the volume models block 330 to the numerical processing block 350 and then to the applications block 340 and/or to the operational decision block 360. As another example, a workflow may proceed from the surface models block 320 to the applications block 340 and then to the operational decisions block 360 (e.g., consider an application that operates using a structural model).

In the example of FIG. 3, the operational decisions block 360 may include a seismic survey design process 361, a well rate adjustment process 352, a well trajectory planning process 363, a well completion planning process 364 and a process for one or more prospects, for example, to decide whether to explore, develop, abandon, etc. a prospect.

Referring again to the data block 310, the well tops or drill hole data 312 may include spatial localization, and optionally surface dip, of an interface between two geological formations or of a subsurface discontinuity such as a geological fault; the seismic interpretation data 314 may include a set of points, lines or surface patches interpreted from seismic reflection data, and representing interfaces between media (e.g., geological formations in which seismic wave velocity differs) or subsurface discontinuities; the outcrop interpretation data 316 may include a set of lines or points, optionally associated with measured dip, representing boundaries between geological formations or geological faults, as interpreted on the earth surface; and the geological knowledge data 318 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g. fault A truncates fault B, fault B intersects fault C, etc.).

As to the one or more boundary representations 332, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 334, it may include a grid that partitions a volume of interest into different elementary volumes (cells), for example, that may be indexed according to a pre-defined, repeating pattern. As to the one or more unstructured meshes 336, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 351, it may include calculation of velocity of propagation of seismic waves (e.g., where seismic velocity depends on type of seismic wave and on direction of propagation of the wave). As to the seismic processing 352, it may include a set of processes allowing identification of localization of seismic reflectors in space, physical characteristics of the rocks in between these reflectors, etc.

As to the facies and petrophysical property interpolation 353, it may include an assessment of type of rocks and of their petrophysical properties (e.g., porosity, permeability), for example, optionally in areas not sampled by well logs or coring. As an example, such an interpolation may be constrained by interpretations from log and core data, and by prior geological knowledge.

As to the flow simulation 354, as an example, it may include simulation of flow of hydrocarbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 355, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example, a geomechanical simulation may be used for a variety of purposes such as, for example, prediction of fracturing, reconstruction of the paleo-geometries of the reservoir as they were prior to tectonic deformations, etc.

As to geochemical simulation 356, such a simulation may simulate evolution of hydrocarbon formation and composition through geological history (e.g., to assess the likelihood of oil accumulation in a particular subterranean formation while exploring new prospects).

As to the various applications of the applications block 340, the well prognosis application 342 may include predicting type and characteristics of geological formations that may be encountered by a drill-bit, and location where such rocks may be encountered (e.g., before a well is drilled); the reserve calculations application 344 may include assessing total amount of hydrocarbons or ore material present in a subsurface environment (e.g., and estimates of which proportion can be recovered, given a set of economic and technical constraints); and the well stability assessment application 346 may include estimating risk that a well, already drilled or to-be-drilled, will collapse or be damaged due to underground stress.

As to the operational decision block 360, the seismic survey design process 361 may include deciding where to place seismic sources and receivers to optimize the coverage and quality of the collected seismic information while minimizing cost of acquisition; the well rate adjustment process 362 may include controlling injection and production well schedules and rates (e.g., to maximize recovery and production); the well trajectory planning process 363 may include designing a well trajectory to maximize potential recovery and production while minimizing drilling risks and costs; the well trajectory planning process 364 may include selecting proper well tubing, casing and completion (e.g., to meet expected production or injection targets in specified reservoir formations); and the prospect process 365 may include decision making, in an exploration context, to continue exploring, start producing or abandon prospects (e.g., based on an integrated assessment of technical and financial risks against expected benefits).

The system 300 can include and/or can be operatively coupled to a system such as the system 100 of FIG. 1. For example, the workspace framework 110 may provide for instantiation of, rendering of, interactions with, etc., the graphical user interface (GUI) 120 to perform one or more actions as to the system 300. In such an example, access may be provided to one or more frameworks (e.g., DRILLPLAN, PETREL, TECHLOG, PIPESIM, ECLIPSE, INTERSECT, etc.). One or more frameworks may provide for geo data acquisition as in block 310, for structural modeling as in block 320, for volume modeling as in block 330, for running an application as in block 340, for numerical processing as in block 350, for operational decision making as in block 360, etc.

The PIPESIM framework can be executed to perform various steady-state flow assurance workflows, for example, for front-end system design, production operations, etc. Flow assurance capabilities can help assure fluid transport such as from sizing of facilities, pipelines, and lift systems, to ensuring effective liquids and solids management, to well and pipeline integrity. The PIPESIM framework can provide for dynamic analysis where, for example, a PIPESIM-to-OLGA converter tool may be implemented for rapid conversion of models. Shared heat transfer, multiphase flow, and fluid behavior methodologies help to ensure data quality and consistency between the steady-state and transient analyses.

As an example, a framework may provide for electric submersible pump (ESP) surface power calculations. For example, a framework simulator can calculate the ESP power consumption at surface conditions where an installed motor and cable in well are modeled. As an example, a framework may provide for gas lift modeling. In such an example, the framework may access a gas lift valves catalog or the Valve Performance Clearinghouse (VPC) catalog from Louisiana State University for gas lift modeling. As an example, a framework may provide for annulus flow in surface pipes modeling. In such an example, a workflow may involve modeling multilateral completions, configurations for SAGD operations, etc. As an example, a framework may provide for prediction of gas lift multi-pointing. Gas lift multipointing is a nondesirable condition that can be modeled using a gas lift diagnostics task. A framework such as the PIPESIM framework can predict such a condition in pressure and temperature and system analysis tasks. As an example, a framework may provide for generation of erosion and corrosion risk indicators. For example, consider generation of risk indicators for erosional velocity ratio (EVR) and corrosion rate, which may be generated based on user-defined risk ranking limits from negligible to severe. In such an example, results may be visualized using a color gradient on a GIS canvas.

As an example, a framework may include various toolkit features. For example, consider Python toolkit features. Such toolkit features can provide extensibility for one or more additional functionalities for a framework or frameworks.

Figure 4:
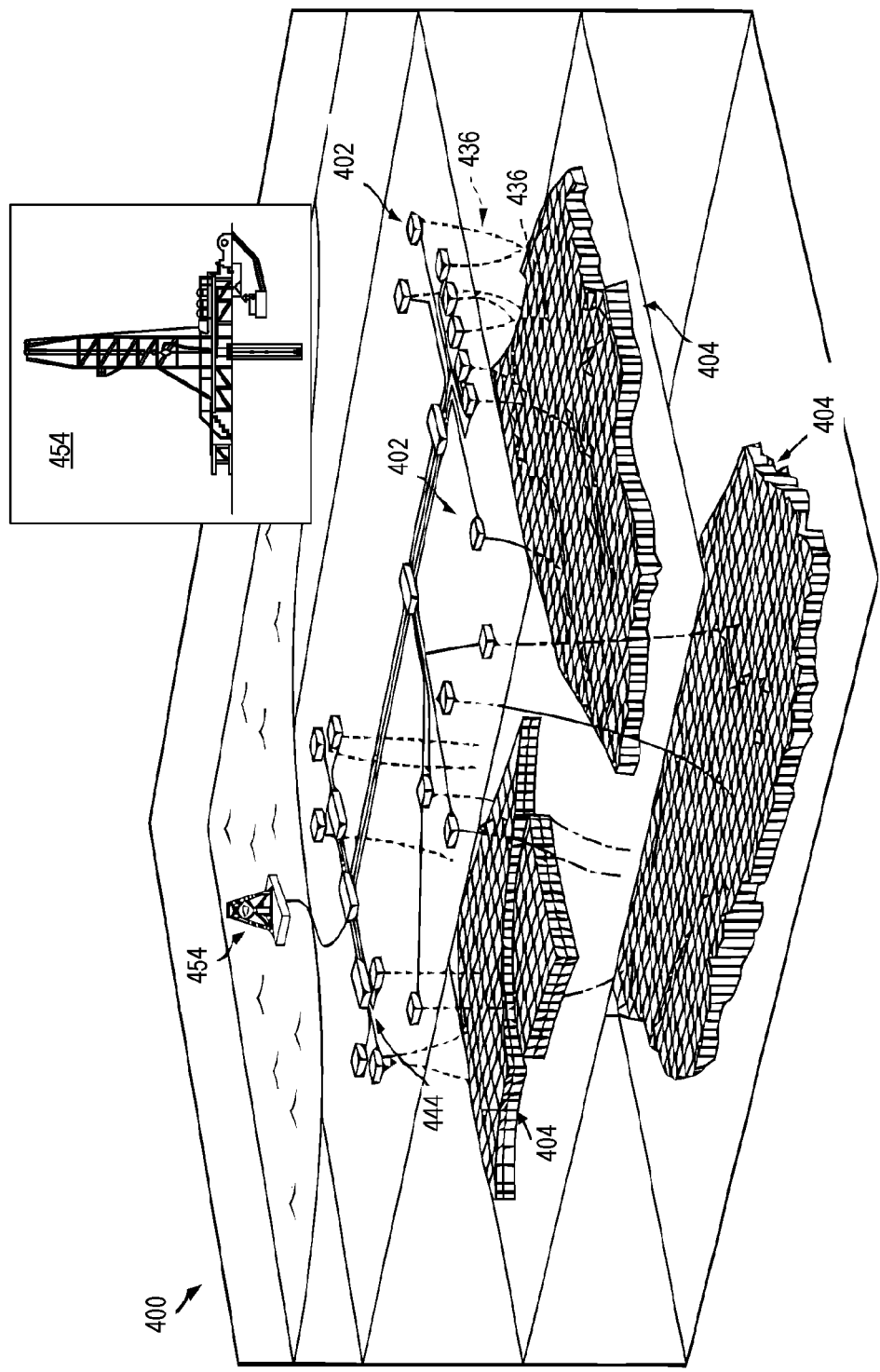
FIG. 4 illustrates an example of a geologic environment and examples of equipment.

FIG. 4 shows an example of a geologic environment 400 as including various types of equipment and features. As shown, the geologic environment 400 includes a plurality of wellsites 402, which may be operatively connected to a processing facility. In the example of FIG. 4, individual wellsites 402 can include equipment that can form individual wellbores 436. Such wellbores can extend through subterranean formations including one or more reservoirs 404. Such reservoirs 404 can include fluids, such as hydrocarbons. As an example, wellsites can draw fluid from one or more reservoirs and pass them to one or more processing facilities via one or more surface networks 444. As an example, a surface network can include tubing and control mechanisms for controlling flow of fluids from a wellsite to a processing facility. In the example of FIG. 4, a rig 454 is shown, which may be an offshore rig or an onshore rig. As an example, a rig can be utilized to drill a borehole that can be completed to be a wellbore where the wellbore can be in fluid communication with a reservoir such that fluid may be produced from the reservoir.

Figure 5:
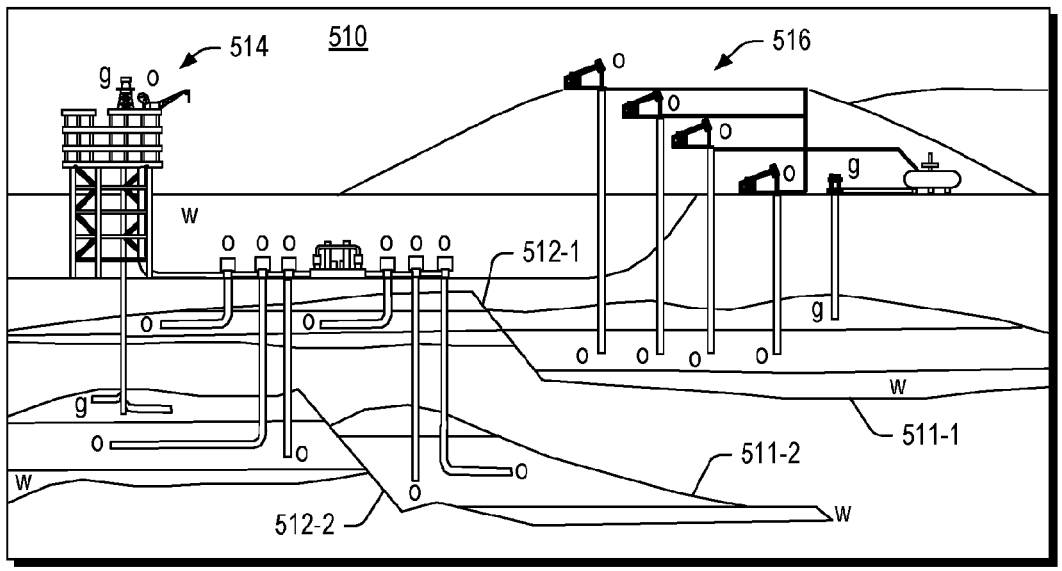
FIG. 5 illustrates examples of equipment and examples of simulators.
Figure 5:
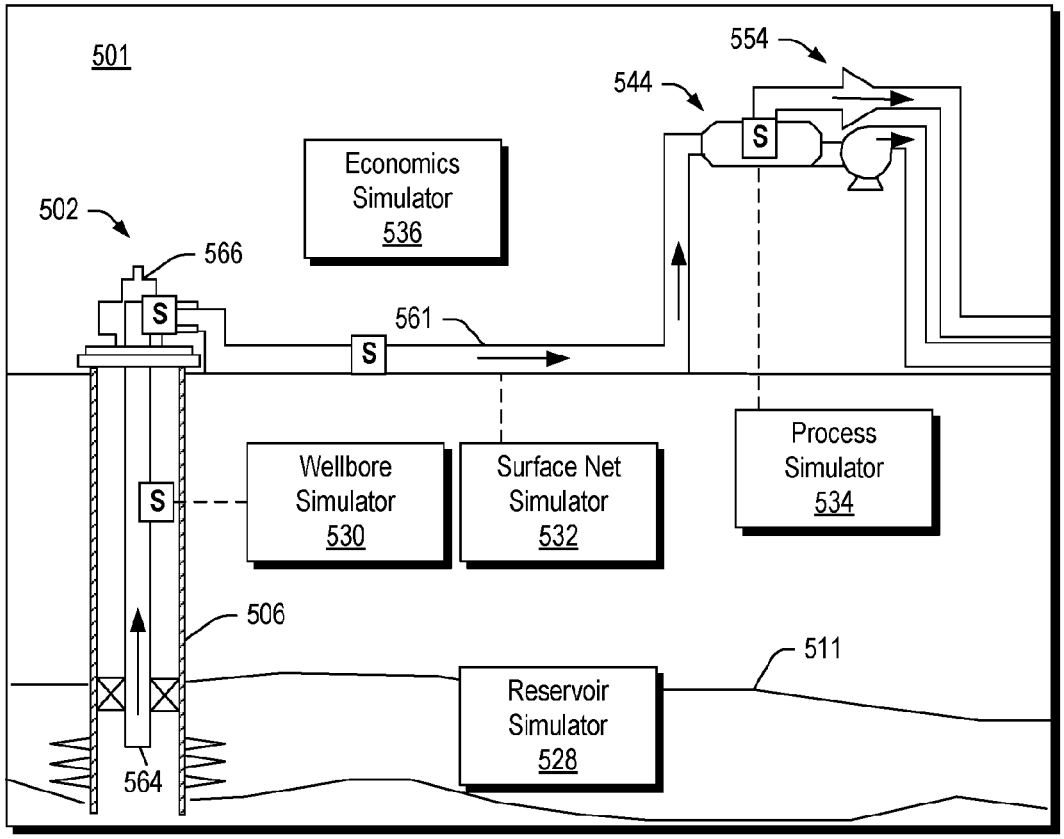

FIG. 5 shows an example of a portion of a geologic environment 501 and an example of a larger portion of a geologic environment 510. As shown, a geologic environment can include one or more reservoirs 511-1 and 511-2, which may be faulted by faults 512-1 and 512-2 and which may include oil (o), gas (g) and/or water (w). FIG. 5 also shows some examples of offshore equipment 514 for oil and gas operations related to the reservoirs 511-1 and 511-2 and onshore equipment 516 for oil and gas operations related to the reservoir 511-1. As an example, a system may be implemented for operations associated with one or more of such reservoirs.

As to the geologic environment 501, FIG. 5 shows a schematic view where the geologic environment 501 can include various types of equipment. As shown in FIG. 5, the environment 501 can include a wellsite 502 and a fluid network 544. In the example of FIG. 5, the wellsite 502 includes a wellbore 506 extending into earth as completed and prepared for production of fluid from a reservoir 511 (e.g., one of the reservoirs 511-1 or 511-2).

In the example of FIG. 5, wellbore production equipment 564 extends from a wellhead 566 of the wellsite 502 and to the reservoir 511 to draw fluid to the surface. As shown, the wellsite 502 is operatively connected to the fluid network 544 via a transport line 561. As indicated by various arrows, fluid can flow from the reservoir 511, through the wellbore 506 and onto the fluid network 544. Fluid can then flow from the fluid network 544, for example, to one or more fluid processing facilities.

In the example of FIG. 5, sensors (S) are located, for example, to monitor various parameters during operations. The sensors (S) may measure, for example, pressure, temperature, flowrate, composition, and other parameters of the reservoir, wellbore, gathering network, process facilities and/or other portions of an operation. As an example, the sensors (S) may be operatively connected to a surface unit (e.g., to instruct the sensors to acquire data, to collect data from the sensors, etc.).

In the example of FIG. 5, a surface unit can include computer facilities, such as a memory device, a controller, one or more processors, and display unit (e.g., for managing data, visualizing results of an analysis, etc.). As an example, data may be collected in the memory device and processed by the processor(s) (e.g., for analysis, etc.). As an example, data may be collected from the sensors (S) and/or by one or more other sources. For example, data may be supplemented by historical data collected from other operations, user inputs, etc. As an example, analyzed data may be used in a decision-making process.

As an example, a transceiver may be provided to allow communications between a surface unit and one or more pieces of equipment in the environment 501. For example, a controller may be used to actuate mechanisms in the environment 501 via the transceiver, optionally based on one or more decisions of a decision-making process. In such a manner, equipment in the environment 501 may be selectively adjusted based at least in part on collected data. Such adjustments may be made, for example, automatically based on computer protocol, manually by an operator or both. As an example, one or more well plans may be adjusted (e.g., to select optimum operating conditions, to avoid problems, etc.).

To facilitate data analyses, one or more simulators may be implemented (e.g., optionally via the surface unit or other unit, system, etc.). As an example, data fed into one or more simulators may be historical data, real time data or combinations thereof. As an example, simulation through one or more simulators may be repeated or adjusted based on the data received.

In the example of FIG. 5, simulators can include a reservoir simulator 528, a wellbore simulator 530, a surface network simulator 532, a process simulator 534 and an economics simulator 536. As an example, the reservoir simulator 528 may be configured to solve for hydrocarbon flow rate through a reservoir and into one or more wellbores. As an example, the wellbore simulator 530 and surface network simulator 532 may be configured to solve for hydrocarbon flow rate through a wellbore and a surface gathering network of pipelines. As to the process simulator 534, it may be configured to model a processing plant where fluid containing hydrocarbons is separated into its constituent components (e.g., methane, ethane, propane, etc.), for example, and prepared for further distribution (e.g., transport via road, rail, pipe, etc.) and optionally sale. As an example, the economics simulator 536 may be configured to model costs associated with at least part of an operation. For example, consider MERAK framework (Schlumberger Limited, Houston, Texas), which may provide for economic analyses.

As an example, a system can include and/or be operatively coupled to one or more of the simulators 528, 530, 532, 534 and 536 of FIG. 5. As an example, such simulators may be associated with frameworks and/or may be considered tools (see, e.g., the system 100 of FIG. 1, etc.).

Figure 6:
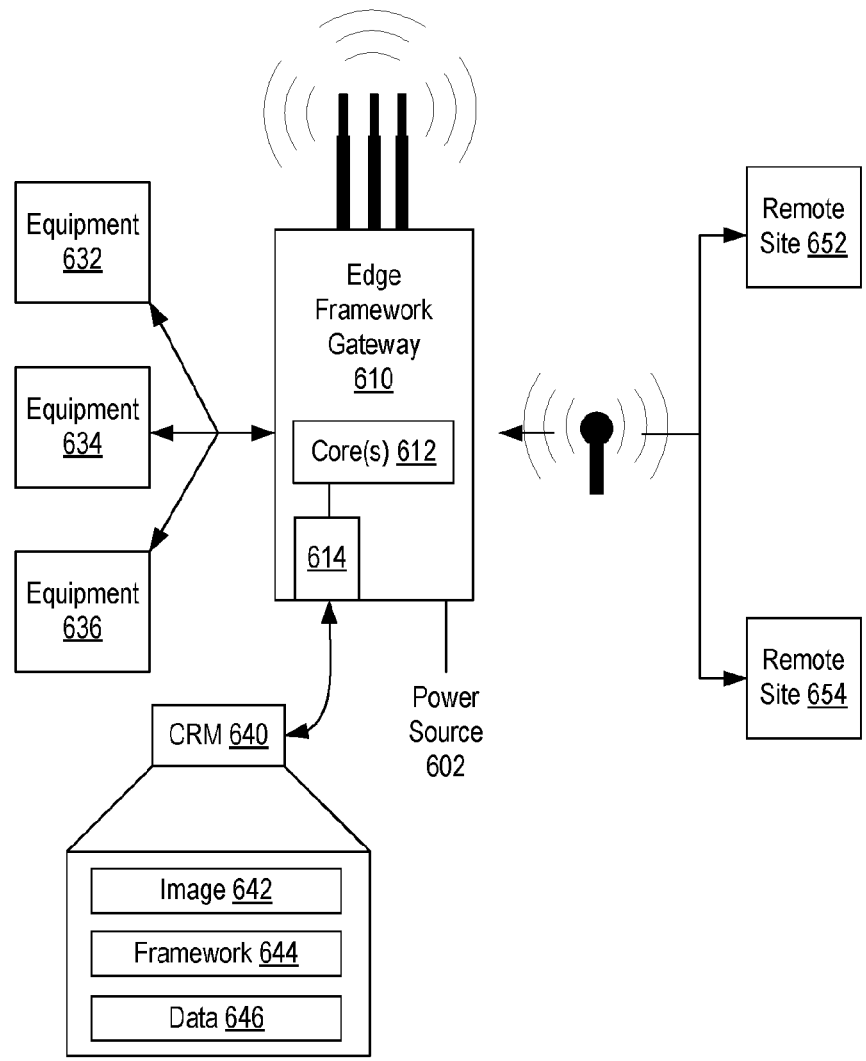
FIG. 6 illustrates an example of a system.

FIG. 6 shows an example of a system 600 and an example of an architecture 601. As shown, the architecture 601 can provide an integrated solution for action in oil and/or gas operations at each of a number of wells. The architecture 601 can include one or more physics models, one or more machine learning models, an interface for real-time data, an interface for ad hoc data, a data-model interaction component, and a result interface where an output result can be a control trigger that can call for an action or actions by a piece or pieces of equipment.

As shown, the system 600 can include a power source 602 (e.g., solar, generator, etc.) that can provide power to an edge framework gateway 610 that can include one or more computing cores 612 and one or more media interfaces 614 that can, for example, receive a computer-readable medium 640 that may include one or more data structures such as an image 642, a framework 644 and data 646. In such an example, the image 642 may be an operating system image that can cause one or more of the one or more cores 612 to establish an operating system environment that is suitable for execution of one or more applications. For example, the framework 644 may be an application suitable for execution in an established operating system in the edge framework gateway 610.

In the example of FIG. 6, the edge framework gateway 610 ("EF") can include one or more types of interfaces suitable for receipt and/or transmission of information. For example, consider one or more wireless interfaces that may provide for local communications at a site such as to one or more pieces of local equipment 632, 634 and 636 and/or remote communications to one or more remote sites 652 and 654.

As an example, the EF 610 may be installed at a site that is some distance from a city, a town, etc. In such an example, the EF 610 may be accessible via a satellite communication network.

A communications satellite is an artificial satellite that relays and amplifies radio telecommunication signals via a transponder. A satellite communication network can include one or more communication satellites that may, for example, provide for one or more communication channels. As of 2021, there are about 2,000 communications satellites in Earth orbit, some of which are geostationary above the equator such that a satellite dish antenna of a ground station can be aimed permanently at a satellite rather than tracking the satellite.

High frequency radio waves used for telecommunications links travel by line-of-sight, which may be obstructed by the curve of the Earth. Communications satellites can relay signal around the curve of the Earth allowing communication between widely separated geographical points. Communications satellites can use one or more frequencies (e.g., radio, microwave, etc.), where bands may be regulated and allocated.

Satellite communication tends to be slower and more costly than other types of electronic communication due to factors such as distance, equipment, deployment and maintenance. For wellsites that do not have other forms of communication, satellite communication can be limiting in one or more aspects. For example, where a controller is to operate in real-time or near real-time, a cloud-based approach to control may introduce too much latency. As shown in the example of FIG. 6, the EF 610 may be deployed where it can operate locally with one or more pieces of equipment 632, 634, 636, etc., which may be for purposes of control.

As desired, from time to time, communication may occur between the EF 610 and one or more remote sites 652, 654, etc., which may be via satellite communication where latency and costs are tolerable. As an example, the CRM 640 may be a removable drive that can be brought to a site via one or more modes of transport. For example, consider an air drop, a human via helicopter, plane or boat, etc.

As to an air drop, consider dropping an electronic device that can be activated locally once on the ground or while being suspended by a parachute en route to ground. Such an electronic device may communicate via a local communication system such as, for example, a local WiFi, BLUETOOTH, cellular, etc., communication system. In such an example, one or more data structures may be transferred from the electronic device (e.g., as including a CRM) to the EF 610. Such an approach can provide for local control where one or more humans may or may not be present at the site. As an example, an autonomous and/or human controllable vehicle at a site may help to locate an electronic device and help to download its payload to an EF such as the EF 610. For example, consider a local drone or land vehicle that can locate an air dropped electronic device and retrieve it and transfer one or more data structures from the electronic device to an EF, directly and/or indirectly. In such an example, the drone or land vehicle may establish communication with and/or read data from the electronic device such that data can be communicated (e.g., transferred to one or more EFs).

As to drones, consider a drone that includes one or more features of one or more of the following types of drones DJI Matrice 210 RTK, DJI Matrice 600 PRO, Elistair Orion Tethered Drone, Freefly ALTA 8, GT Aeronautics GT380, Skydio 2, Sensefly eBee X, Skyfront Perimeter 8, Vantage Robotics Snap, Viper Vantage and Yuneec H920 Plus Tornado. The DJI Matrice 210 RTK can have a takeoff weight of 6.2 g (include battery and max 1.2 kg payload), a maximum airspeed of 13-30 m/s (30-70 mph), a range of 500 m-1 km with standard radio/video though it may be integrated with other systems for further range from base, a flight time of 15-30 minutes (e.g., depending on battery and payload choices, etc.). As an example, a gateway may be a mobile gateway that includes one or more features of a drone and/or that can be a payload of a drone.

Figure 7:
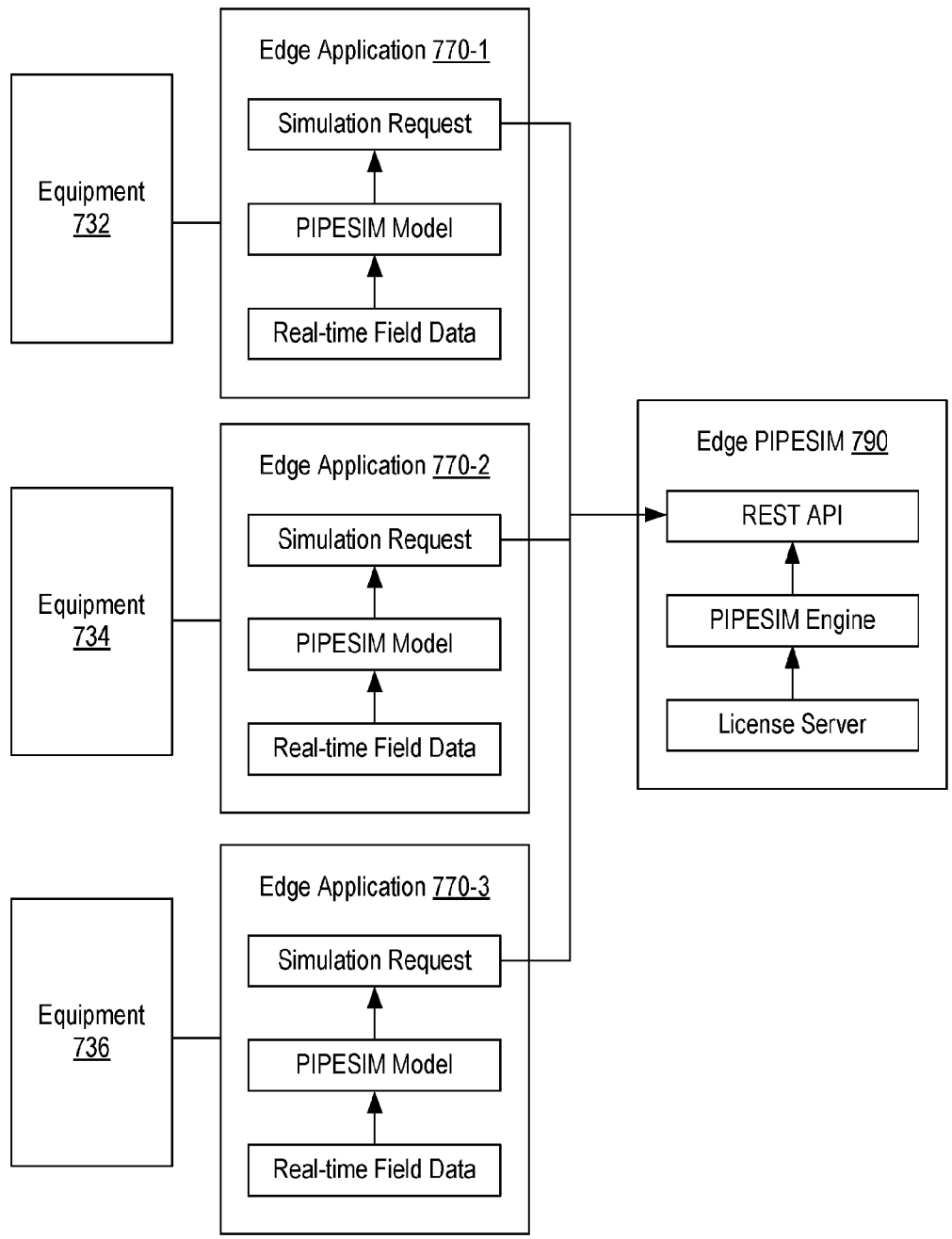
FIG. 7 illustrates an example of a system.

FIG. 7 shows an example of a system 700 where one or more sets of equipment 732, 734 and 736 are associated with corresponding edge applications 770-1, 770-2 and 770-3, which can be operatively coupled to an edge framework 790, which is shown, for example, as being an edge PIPESIM framework. In the example of FIG. 7, each of the edge applications 770-1, 770-2 and 770-3 and the edge framework ("EF") 790 may be pre-installed and/or locally installed. For example, consider a thumb drive, a removable SSD, etc., that can be utilized to install executable instructions, data, etc.

As shown, each of the edge applications 770-1, 770-2 and 770-3 includes a physics model, which, in the example of FIG. 7, is shown to be a PIPESIM model, that can receive real-time field data (e.g., and/or other data) and issue a simulation request, which may be triggered at least in part by the received real-time field data (e.g., the data themselves and/or an analysis thereof). As shown, the EF 790 includes a license server, a framework simulation engine (e.g., a PIPESIM engine) and a REST API where the REST API can receive one or more API calls, for example, as one or more simulation requests. The EF 790 can respond to an API call with output such as, for example, simulation results where the simulation results may be provided to one or more of the edge applications 770-1, 770-2 and 770-3 for individual and/or coordinated control of one or more of the sets of equipment 732, 734 and 736.

Figure 8:
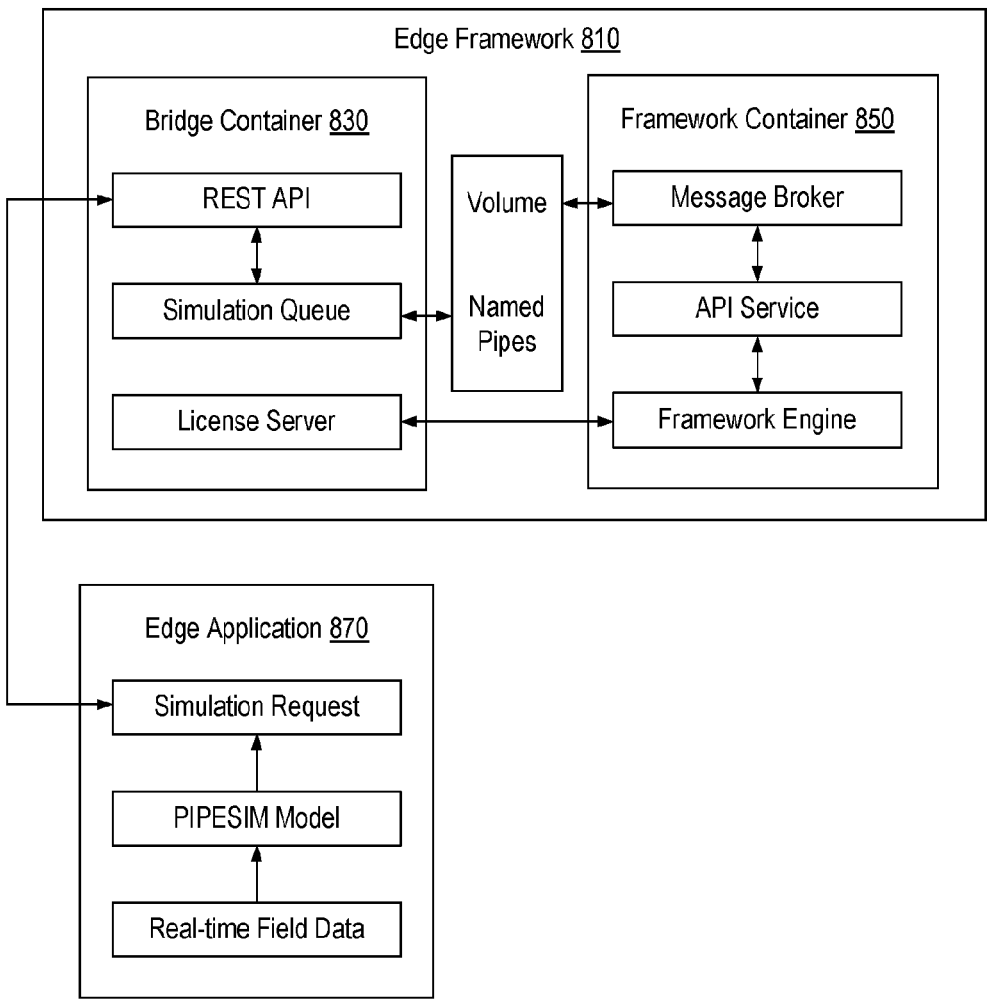
FIG. 8 illustrates an example of a system.

FIG. 8 shows an example of a system 800 with an EF 810 that includes a bridge container 830 and a framework container 850 where the EF 810 can be operatively coupled to an edge application ("EA") 870. As shown, the bridge container 830 can include a REST API, a simulation queue, and a license server while the framework container 850 can include a message broker, an API service and a framework engine (e.g., a PIPESIM engine and/or another type of simulation engine). Upon issuance of a simulation request from the EA 870 to the REST API, the EF 810 can stage the simulation request in the simulation queue, where, upon a valid license or license authorization, the simulation queue can provide for named pipes and interaction within a volume with the message broker. The message broker can utilize an API service that can be local to the framework container 850 such that a call can be made to the framework engine to perform a desired simulation, which can generate a simulation result (or results). In turn, the API service can receive output from the framework engine (e.g., a simulation result) and utilize the message broker to forward the output to the bridge container 830, which, in turn, can then respond to the API call (e.g., simulation request) of the EA 870. As explained, an EA may be a control application such that one or more control actions can be formulated and/or initiated by the EA 870 for equipment control. As an example, an EA may be networked and/or otherwise operatively coupled with one or more other EAs. In such an example, logic may be constructed for triggering, data shared for enhanced insights, data analyzed for purposes of consistency (e.g., errors, statistics, etc.), etc. As an example, a network may be a local network that may utilize local communication equipment (e.g., BLUETOOTH, line-of-sight, etc.).

Referring again to the architecture 601, as explained, one or more physics-based models can be deployed to an edge for implementation, for example, to operate responsive to real-time data for one or more types of equipment control. As an example, a fluid simulation framework such as the PIPESIM framework may be implemented in an edge manner. Such a fluid simulation framework can be a multiphase flow simulation framework suitable for handling multiphase flow that may occur in one or more types of oil and/or gas field operations. As explained, such an approach may provide for local control where one or more types of low latency, cost effective and practical communication may not be available or otherwise be too intermittent for purposes of equipment control. As an example, an edge deployed and implemented framework may provide for using locally generated simulation results of a framework to control equipment locally at the edge.

As shown in FIG. 6, an EF may execute within a gateway, such as, for example, an AGORA gateway (e.g., consider one or more processors, memory, etc., which may be deployed as a "box" that can be locally powered and that can communicate locally with other equipment via one or more interfaces). A physics model can be a fluid flow type of model, which may be run for simulation using one or more types of workflows (e.g., data flows, etc.) where simulation results can be utilized for one or more types of equipment control.

As an example, a gateway can include one or more features of an AGORA gateway (e.g., v.202, v.402, etc.) and/or another gateway. For example, consider an INTEL ATOM E3930 or E3950 Dual Core with DRAM and an eMMC and/or SSD. Such a gateway may include a trusted platform module (TPM), which can provide for secure and measured boot support (e.g., via hashes, etc.). A gateway may include one or more interfaces (e.g., Ethernet, RS485/422, RS232, etc.). As to power, a gateway may consume less than about 100 W (e.g., consider less than 10 W or less than 20 W). As an example, a gateway may include an operating system (e.g., consider LINUX DEBIAN LTS). As an example, a gateway may include a cellular interface (e.g., 4G LTE with Global Modem/GPS, etc.). As an example, a gateway may include a WIFI interface (e.g., 802.11 a/b/g/n). As an example, a gateway may be operable using AC 100-240 V, 50/60 Hz or 24 VDC. As to dimensions, consider a gateway that has a protective box with dimensions of approximately 10 in×8 in×4 in.

As an example, a gateway may be part of a drone. For example, consider a mobile gateway that can take off and land where it may land to operatively couple with equipment to thereby provide for control of such equipment. In such an example, the equipment may include a landing pad. For example, a drone may be directed to a landing pad where it can interact with equipment to control the equipment. As an example, a wellhead can include a landing pad where the wellhead can include one or more sensors (e.g., temperature and pressure) and where a mobile gateway can include features for generating fluid flow values using information from the one or more sensors. In such an example, the mobile gateway may issue one or more control instructions (e.g., to a choke valve, a pump, etc.).

As an example, a gateway may include hardware (e.g., circuitry) that can provide for operation of a drone. As an example, a gateway may be a drone controller and a controller for other equipment where the drone controller can position the gateway (e.g., via drone flight features, etc.) such that the gateway can control the other equipment.

As an example, a mobile gateway may be operable in one or more safety modes. For example, if conditions change, a mobile gateway may be able to issue one or more safety instructions and then fly away to protect the mobile gateway. In such an example, the mobile gateway and data therein (e.g., a black box) may be kept safe. Such an approach may be utilized, for example, where an operational issue arises, where a site is invaded by one or more intruders, etc. For example, consider an intruder that aims to interfere with equipment, which may be to damage equipment, alter the equipment, steal fluid, etc. In such an example, a mobile gateway may detect and/or receive a detection signal and place equipment in a suitable state and then fly away to protect itself. Where an intruder departs, the mobile gateway may return and run an assessment to determine whether a return to operation is possible or not. As mentioned, where a gateway include satellite communication circuitry, a gateway may issue one or more signals such as one or more distress or SOS types of signals that may alert as to a threat, which may be imminent and/or in progress.

As an example, a gateway may include one or more cameras such that the gateway can record conditions. For example, consider a motion detection camera that can detect the presence of an object. In such an example, an image of the object and/or an analysis (e.g., image recognition) signal thereof may be transmitted (e.g., via a satellite communication link) such that a risk may be assessed at a site that is distant from the gateway.

As an example, a gateway may include one or more accelerometers, gyroscopes, etc. As an example, a gateway may include circuitry that can perform seismic sensing that indicates ground movements. Such circuitry may be suitable for detecting and recording equipment movements and/or movement of the gateway itself.

As explained, a gateway can include features that enhance its operation at a remote site that may be distant from a city, a town, etc., such that travel to the site and/or communication with equipment at the site is problematic and/or costly. As explained, a gateway can include an operating system and memory that can store one or more types of applications that may be executable in an operating system environment. Such applications can include one or more security applications, one or more control applications, one or more simulation applications, etc.

As an example, various types of data may be available, for example, consider real-time data from equipment and ad hoc data. In various examples, data from sources connected to a gateway may be real-time, ad hoc data, sporadic data, etc. As an example, lab test data may be available that can be used to fine tune one or more models (e.g., locally, etc.). As an example, data from a framework such as the AVOCET framework may be utilized where results and/or data thereof can be sent to the edge. As an example, one or more types of ad hoc data may be stored in a database and sent to the edge.

In an example, a data model interaction can include running an instance of the PIPESIM framework with a given input to calculate a flow rate, and then converting the flow rate into an injection rate for chemical injection. In such an example, the flow rate can be utilized in formulating a control instruction for a pump such that the pump can deliver a desired amount of chemical. Such an approach may be implemented iteratively or relatively continuously as, for example, execution time for an instance of a PIPESIM simulator can be of the order of several hundred milliseconds or less (e.g., depending on hardware, etc., that may be provided in a gateway, etc.).

As explained, for one or more reasons, a cloud-based framework engine may be impractical, too costly, not fast enough in terms of communication, etc., to provide for suitable control at a site. Where real-time control is desired, a cloud-based framework with satellite communication is likely to be sub-optimal or impractical. An approach as in the example of FIG. 6 can be very low latency and less expensive (e.g., when compared to data transmission to the cloud).

As an example, ad hoc data can be data that can be used to run a physics model, where such data does not change too often. As to some examples, consider one or more of water analysis results coming from labs, and flow measurements taken from well tests. As an example, ad hoc data may be used to validate a model where input to an EF can come from equipment, which can then be used in execution of the model (e.g., to generate results).

As an example, an edge framework can include a full version of a framework simulation engine, which may be a basic engine and/or an advanced engine. As an example, multiple engines may be provided such as in an OLGA type of implementation where a PIPESIM engine can communicate with an OLGA engine. As explained, a container can be generated as a type of data structure that is deployable and implementable on edge hardware. In various examples, a layer or computational environment may be established, which may operate via one or more types of application programming interfaces (e.g., API calls, etc.).

As explained, in various examples, control may be effectuated without a human in the loop (HITL) using an EF such as, for example, the EF 610 of FIG. 6. For example, consider one or more control actions occurring responsive to results from a framework engine as implemented in an edge framework.

Figure 9:
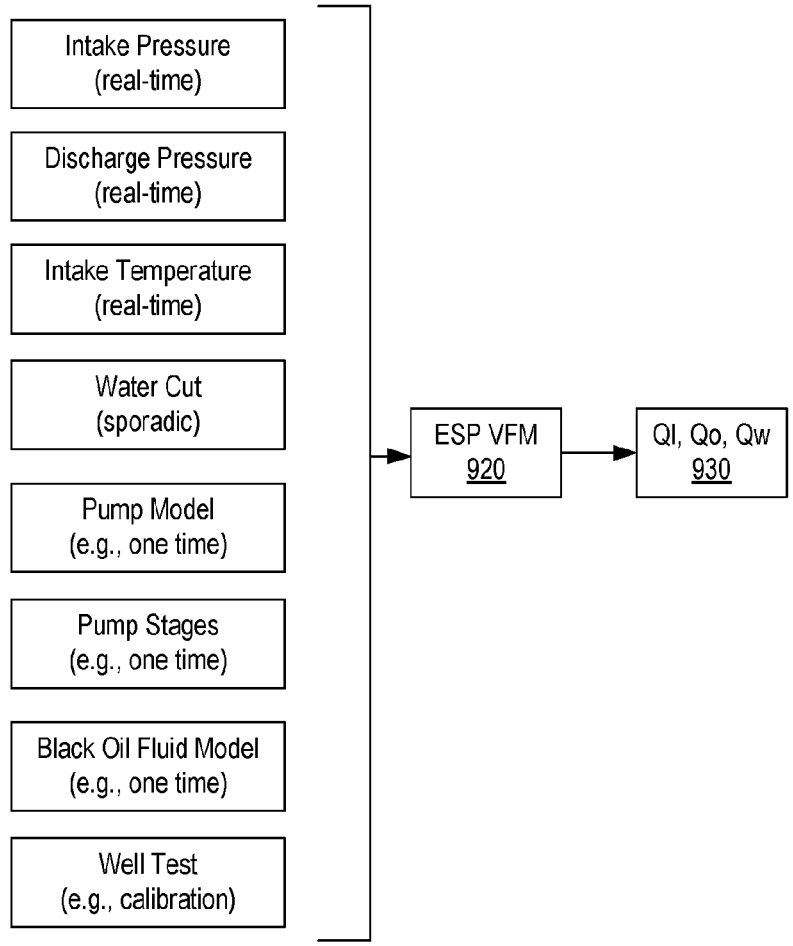
FIG. 9 illustrates an example of a system.

FIG. 9 shows an example of a system 900 with input 910, an ESP virtual flow meter (VFM) 920 and output 930. In the example of FIG. 9, the ESP VFM 920 can be or include an EF that operates using data as in the input 910. As shown, various input can be real-time, sporadic, one-time or from one or more calibrations. As to calibration, consider performing a calibration run that aims to calibrate framework engine results to equipment such that results of the framework engine can be appropriately utilized for equipment control.

In the example of FIG. 9, a black oil fluid model may be utilized as a physics-based model. Black oil can refer to a general type of crude oil that includes alkanes (e.g., of C5 to C30+). Black oil can include a wide variety of chemical species including large, heavy, nonvolatile molecules.

A black oil model can provide for fluid property correlations that cover various types of petroleum fluids, from extra heavy oil to light oil and condensate, and may also be used for simplified gas, utility fluids, and other scenarios. A black oil model may provide for a wide range of viscosity correlations with options for specified dead oil and emulsion viscosities. In various examples, a range of emulsion correlations can cover tight to light emulsion types with optional specification of emulsion tables and optional specification or calculation of the inversion point. A black oil model may provide for specification of gas contaminants, which may be used for compressibility factor adjustment and corrosion calculations. In various examples, a black oil model can provide for specification of thermal data for phases of a black oil fluid for accurate thermal modeling and methods for fluid enthalpy calculation for accurate energy-balance prediction. A black oil model can provide for comprehensive fluid mixing rules.

A black oil model can be described using so-called black oil equations, which can be a set of partial differential equations that describe fluid flow, for example, in a petroleum reservoir for purposes of black-oil reservoir fluid flow simulation. A black oil model can include water modeled explicitly together with two hydrocarbon components, one (pseudo) oil phase and one (pseudo-)gas phase. As an example, another type of model can be utilized such as a compositional model or formulation, in which each hydrocarbon component is handled separately.

Example equations of an extended black-oil model can include:

$$\frac{\partial}{\partial t}\left[\phi\left(\frac{S_o}{B_o} + \frac{R_V S_g}{B_g}\right)\right] + \nabla \cdot \left(\frac{1}{B_o}\vec{u}_o + \frac{R_V}{B_g}\vec{u}_g\right) = 0$$

$$\frac{\partial}{\partial t}\left[\phi\left(\frac{S_w}{B_w}\right)\right] + \nabla \cdot \left(\frac{1}{B_w}\vec{u}_w\right) = 0$$

-continued
$$\frac{\partial}{\partial t}\left[\phi\left(\frac{S_g}{B_g} + \frac{R_s S_o}{B_o}\right)\right] + \nabla \cdot \left(\frac{R_s}{B_o}\vec{u}_o + \frac{1}{B_g}\vec{u}_g\right) = 0$$

The foregoing equations include porosity of the porous medium, $S_w$ as water saturation, $S_o$ and $S_g$ as saturations of liquid (oil) and vapor (gas) phases, and Darcy velocities of the liquid phase, water phase and vapor phase. Oil and gas at the surface (standard conditions) that could be produced from both liquid and vapor phases existing at high pressure and temperature of reservoir conditions can be characterized by $B_o$ as an oil formation volume factor (ratio of some volume of reservoir liquid to the volume of oil at standard conditions obtained from the same volume of reservoir liquid), $B_w$ as a water formation volume factor (ratio of volume of water at reservoir conditions to volume of water at standard conditions), $B_g$ as a gas formation volume factor (ratio of some volume of reservoir vapor to the volume of gas at standard conditions obtained from the same volume of reservoir vapor), $R_S$ as a solution of gas in oil phase (ratio of volume of gas to the volume of oil at standard conditions obtained from some amount of liquid phase at reservoir conditions), $R_V$ as a vaporized oil in gas phase (ratio of volume of oil to the volume of gas at standard conditions obtained from some amount of vapor phase at reservoir conditions).

The PIPESIM framework can formulate and solve a system of equations such as, for example, a black oil system of equations. A PIPESIM framework can include, for example, one or more other types of systems of equations that may be formulated and solved independently and/or in combination with black oil equations. As explained, in various instances an OLGA model may be provided along with OLGA framework capabilities.

The OLGA dynamic multiphase flow simulator models time-dependent behaviors, or transient flow, which can facilitate maximization of production. An OLGA approach may be utilized in offshore and/or onshore developments as to transient behavior in pipelines and/or wellbores.

Transient simulation with the OLGA simulator can provide an added dimension to steady-state analyses by predicting system dynamics such as time-varying changes in flow rates, fluid compositions, temperature, solids deposition and operational changes.

From wellbore dynamics for a well completion to a pipeline system with one or more types of process equipment, an OLGA simulator can provide for accurate prediction of one or more operational conditions involving transient flow.

As an example, the PIPESIM framework may be utilized to determine, in real-time, a production rate of a well, a branch of a well, etc. In such an example, the results can be integrated into a control scheme for control on a desired basis, which may be real-time or near real-time. Where a PIPESIM simulation is run less frequently such as on a daily or weekly basis, the simulation may not represent fluctuations or the "at the moment" state of a well. As such, the results of the simulation may not be optimal for making control decisions. Where a PIPESIM framework is available as an EF, a method can include one or more of detecting production losses, chemical injection calculations, amount of chemical to inject into a well dependent on fluid flow rate, and detection of some flow assurance issues, leaks, etc., one or more of which may be in real-time.

As shown in the example of FIG. 9, the ESP VFM 920 can calculate in real-time the flow rate of a well. As shown, different types of input 910 can be acquired using sensors, etc., where output 930 can include one or more of Ql, Qo and Qw as liquid flow rate, oil flow rate and water flow rate, respectively, where liquid flow rate (Ql) is a sum of oil flow rate (Qo) and water flow rate (Qw). Note that the example of FIG. 9 is not including a flow rate measurement; rather, the flow rate(s) of a well are from the ESP VFM 920. Such an approach can provide for an increased frequency of flow rate knowledge (e.g., real-time versus once every two weeks or every month).

Figure 10:
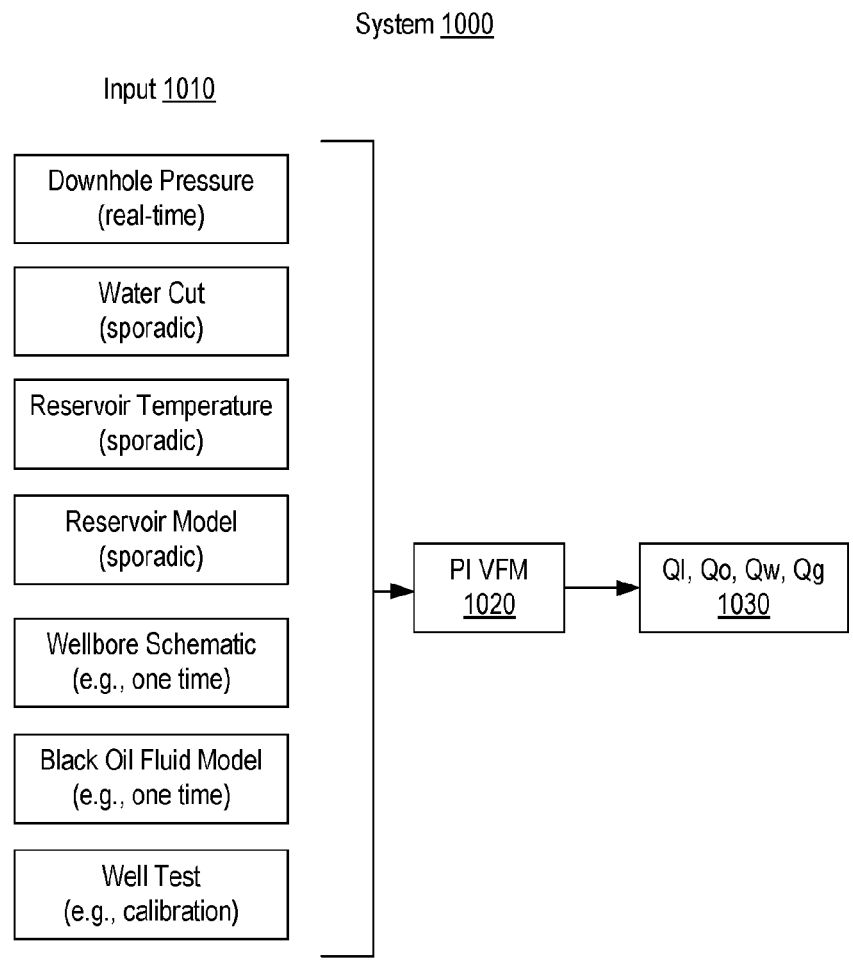
FIG. 10 illustrates an example of a system.

FIG. 10 shows an example of a system 1000 that includes input 1010, a productivity index (PI) virtual flow meter ("PI VFM") 1020 and output 1030. In the example, of FIG. 10, flow rate(s) can be calculated with fewer data input than in the example of FIG. 9, which may be utilized in instances where an ESP may not be present in a well. Where an ESP is present, a combination of the approaches of FIG. 9 and FIG. 10 may be utilized for one or more purposes, for example, to detect leaks and scale precipitation, corrosion, etc.

Figure 11:
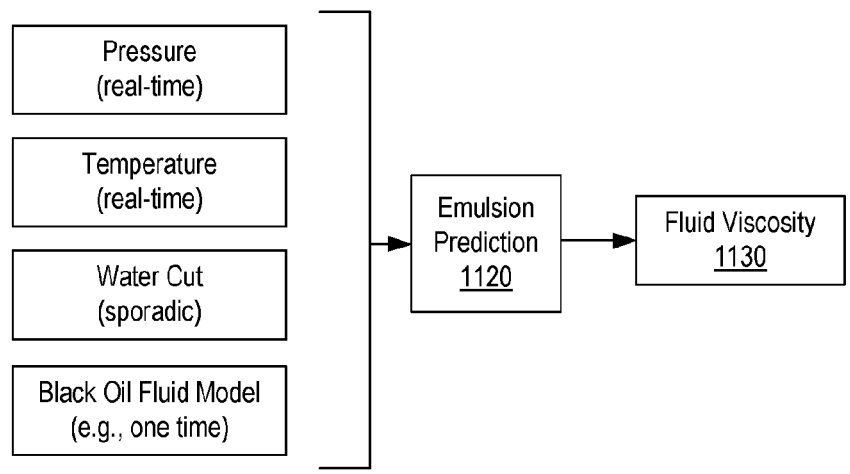
FIG. 11 illustrates an example of a system.

FIG. 11 shows an example of a system 1100 that includes input 1110, an emulsion prediction component 1120 and output 1130, which may provide fluid viscosity. An emulsion can include a mixture of oil and water. Emulsions can reduce lifting capacity of an ESP such that production diminishes (e.g., suboptimal). Emulsions can increase viscosity, for example, an emulsion can be ten times more viscous than fluid. As shown in FIG. 11, where fluid viscosity can be predicted, then the fluid viscosity can be an indicator of the presence of an emulsion and/or characteristics of an emulsion. In a real-time implementation, onset of an emulsion can be detected and control can be implemented to handle the emulsion in one or more manners (e.g., via chemical injection, water injection, gas injection, heat energy, pump rate, etc.).

Figure 12:
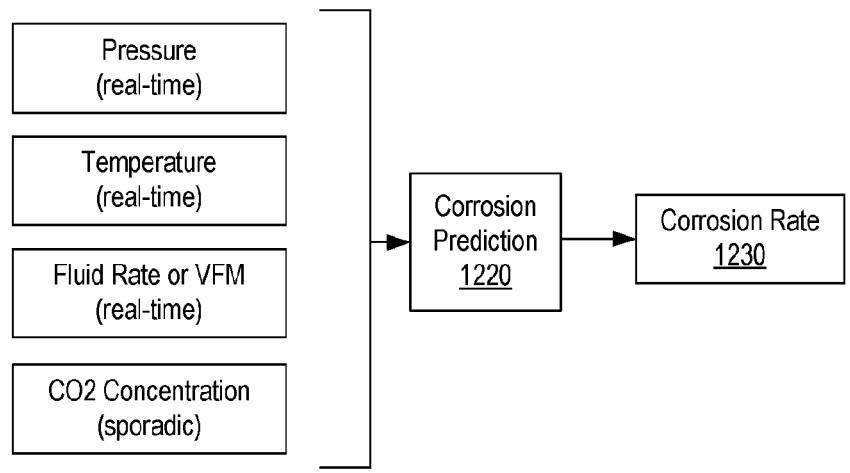
FIG. 12 illustrates an example of a system.

FIG. 12 shows an example of a system 1200 that includes input 1210, a corrosion prediction component 1220 and output 1230, which may provide a corrosion rate. As an example, a framework engine such as a PIPESIM framework engine can be utilized to calculate a corrosion rate at a given point or points. In response, one or more control actions may be taken such as, for example, injection of a chemical or chemicals for mitigating corrosion and/or chemicals and/or phases that can cause corrosion.

Figure 13:
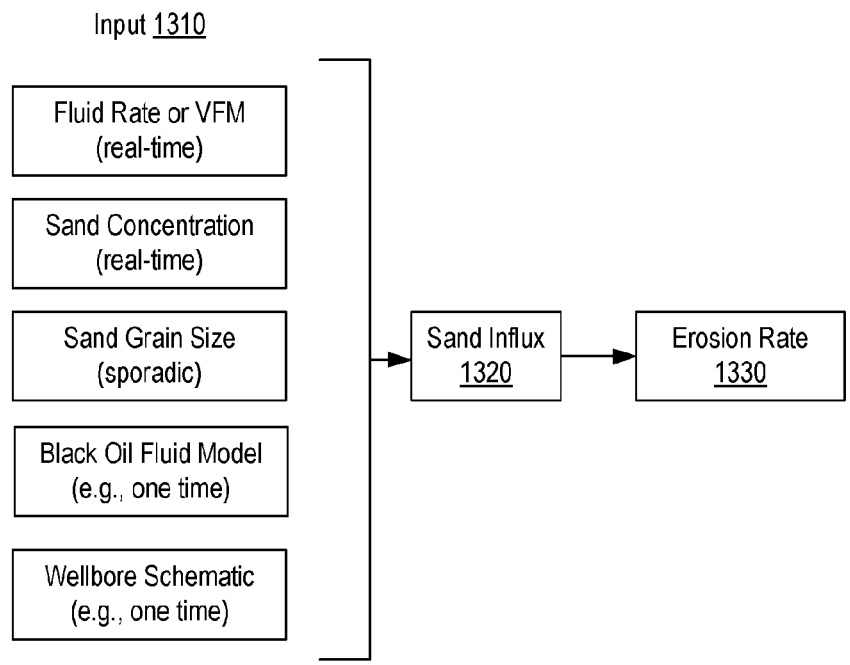
FIG. 13 illustrates an example of a system.

FIG. 13 shows an example of a system 1300 that includes input 1310, a sand flux prediction component 1320 and output 1330, which may provide an erosion rate. In various instances, sand in fluid can cause increased friction, abrasion, etc., that can result in wear of one or more surface such as one or more surfaces of equipment (e.g., an ESP, gas lift valve, etc.).

As an example, a system can include a library or libraries that may be available locally for instantiating one or more EFs, one or more EAs, etc. In such an example, depending on operation or operations, a system may transition from one EF and/or one EA to another EF and/or another EA. As an example, multiple EAs, which may be the same or different, may operate in combination with one or more EFs.

As shown in various examples, license management may be provided such that utilization, capabilities, etc., can be tracked, along with permissions and/or verified uses.

As an example, a system may provide for transmission of one or more types of data to a remote site or remote sites. For example, consider a regulatory framework where production rates are to be reported on a particular basis. In such an example, a local edge system may prepare and transmit reports and/or data for inclusion in such reports. In such an example, the data may be compressed, raw, etc., where the payload to be transmitted is relatively low and suitable for transmission via satellite. In various examples, particular data and/or results may be transmitted to a cloud-based resource(s) for purposes of visualization by a user, optimization in the cloud or elsewhere, etc.

As an example, a production network may include multiple EFs where data and/or results and/or actions (e.g., control actions) may be transmitted to the cloud for purposes of aggregation, full production network (e.g., coupled) simulation, etc. As an example, one or more cloud-based engines may consume one or more results from one or more edge-based engines.

As an example, a physics driven engine on the edge can be executed to issue a control signal (e.g., as a control trigger, etc.). Such a control signal may be, for example, for control of a pump, control of a valve, etc. As an example, a control signal may be for injection of a pre-engineered amount of chemical as a function of real time flow from a well. For example, consider x amount of chemical for y amount of flow, etc. (e.g., according to a schedule, a dynamic schedule, etc.). As an example, injection of material may be performed using a pump installed on a well or, for example, via a pump or tank vehicle.

Figure 14:
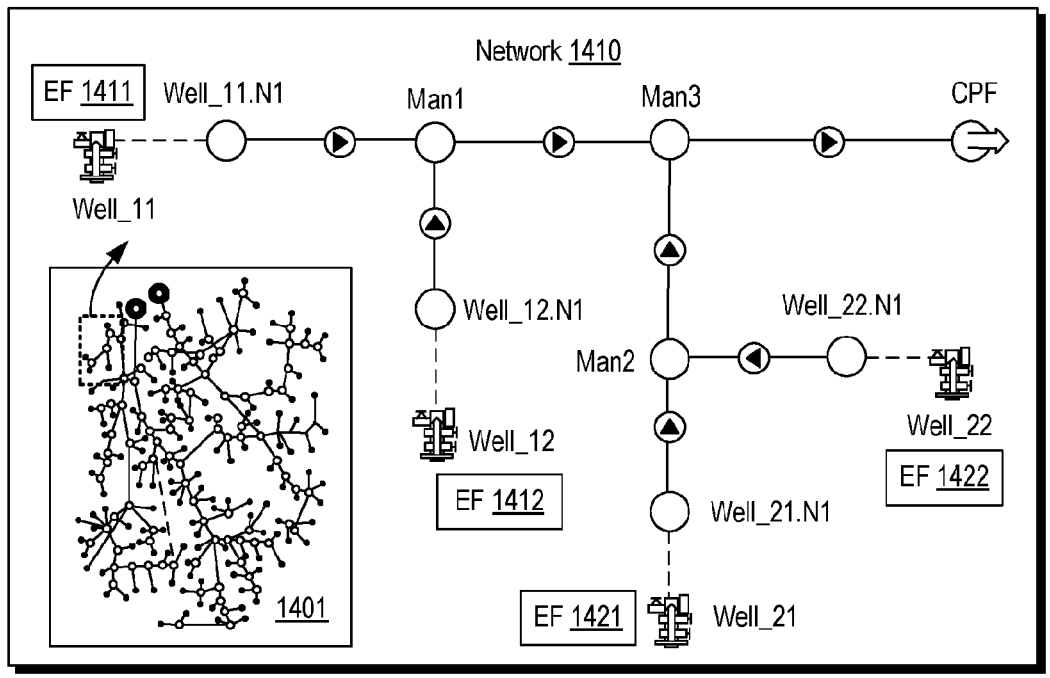
FIG. 14 illustrates an example of a fluid network.

FIG. 14 shows an example of a network 1401 and a detailed portion 1410, which can also be considered to be a network (e.g., network 1410). As shown, a network can include a plurality of wells, for example, the network 1410 includes a well 11, a well 12, a well 21 and a well 22. As shown, a network can include manifolds such as the manifolds labeled Man1, Man2, and Man3 in the network 1310. Various conduits can be utilized for transport of fluid in a network, for example, from one or more wells to one or more processing facilities, optionally via one or more chokes, manifolds, pumps, etc. FIG. 14 shows that a network can be quite complex and include tens of wells or more. The example of FIG. 14 also shows multiple instances of EFs 1411, 1412, 1421 and 1422, which may be on a per well or other basis.

A choke can be a device incorporating an orifice that is used to control fluid flow rate or downstream system pressure. Chokes may be available in various configurations, for example, for one or more of fixed and adjustable modes of operation. As an example, an adjustable choke may enable fluid flow and pressure parameters to be changed to suit process or production requirements, optionally via a controller that is operatively coupled to an actuator that can adjust one or more pieces of the choke. As to a fixed choke, it may be more resistant to erosion under prolonged operation or production of abrasive fluids than various adjustable chokes. As an example, a well may be fitted with a choke that can be selected and/or controlled to suit desired operational parameters (e.g., flow rate, production, etc.).

As an example, one or more artificial lift processes may be utilized in one or more field operations. Artificial lift can include, for example, a surface pump (e.g., a sucker rod pump), a downhole pump (e.g., an electric submersible pump), gas lift, etc. As an example, a network such as the network 1401 of FIG. 14 can include one or more pieces of artificial lift equipment.

As to gas lift, it is a process where, for example, gas may be injected from an annulus into tubing. An annulus, as applied to an oil well or other well for recovering a subsurface resource may refer to a space, lumen, or void between piping, tubing or casing and the piping, tubing, or casing immediately surrounding it, for example, at a greater radius.

As an example, injected gas may aerate well fluid in production tubing in a manner that "lightens" the well fluid such that the fluid can flow more readily to a surface location. As an example, one or more gas lift valves may be configured to control flow of gas during an intermittent flow or a continuous flow gas lift operation. As an example, a gas lift valve may operate based at least in part on a differential pressure control that can actuate a valve mechanism of the gas lift valve.

As an example, a system may operate to model and simulate reserves of oil and/or one or more other fluids (e.g., water, gas, etc.). For example, consider utilization of computational reservoir characterization tools that provide for stratigraphic and structural reservoir understanding, which can involve conversion of 2D maps to 3D models. Such tools may provide for reservoir characterizations during one or more phases of an exploration, development, and production lifecycle.

Figure 15:
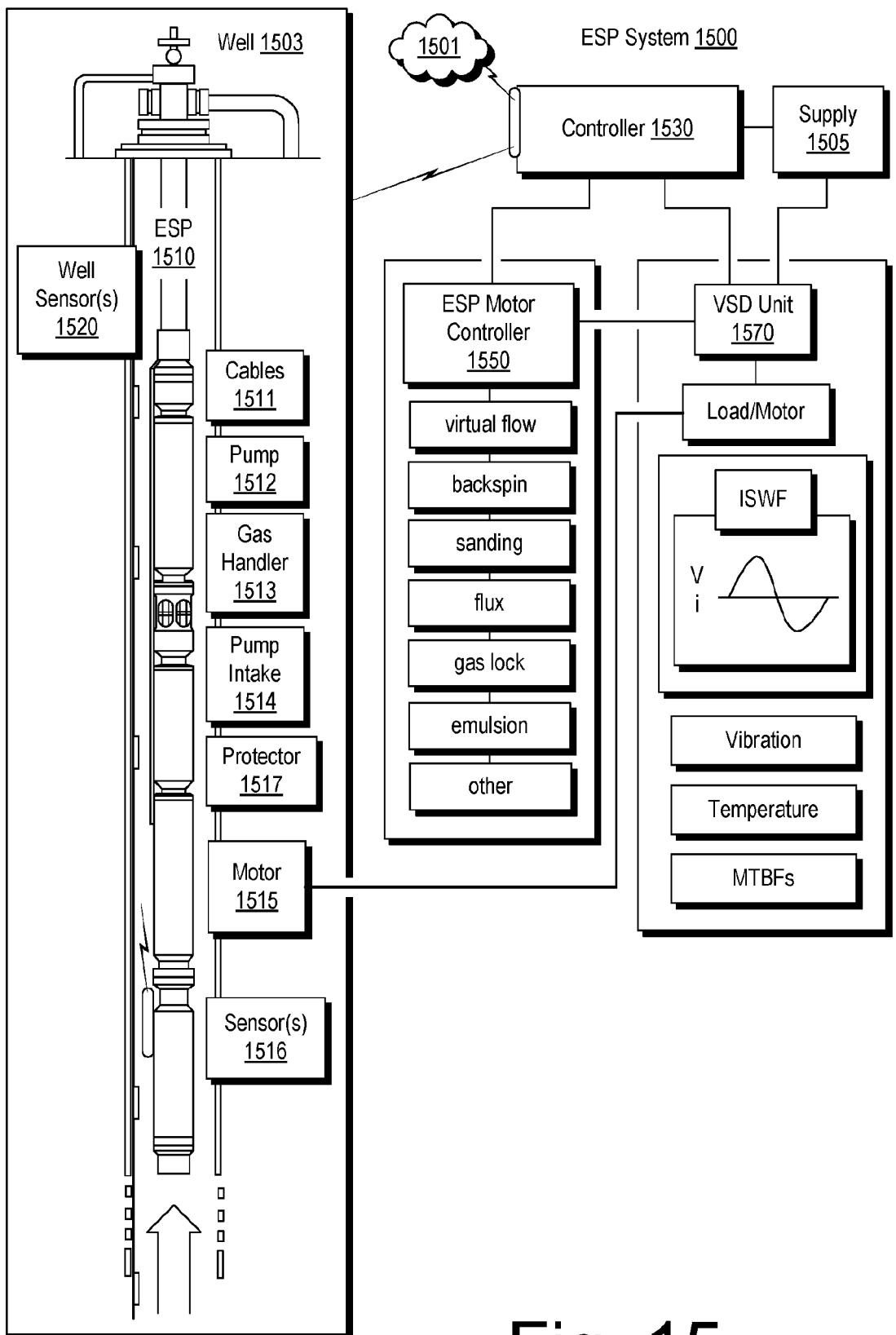
FIG. 15 illustrates an example of an electric submersible pump (ESP) system.

FIG. 15 shows an example of an ESP system 1500 that includes an ESP 1510 as an example of equipment that may be placed in a geologic environment. As an example, an ESP may be expected to function in an environment over an extended period of time (e.g., optionally of the order of years).

In the example of FIG. 15, the ESP system 1500 includes a network 1501, a well 1503 disposed in a geologic environment (e.g., with surface equipment, etc.), a power supply 1505, the ESP 1510, a controller 1530, a motor controller 1550 and a variable speed drive (VSD) unit 1570. The power supply 1505 may receive power from a power grid, an onsite generator (e.g., natural gas driven turbine), or other source. The power supply 1505 may supply a voltage, for example, of about 4.16 kV.

As shown, the well 1503 includes a wellhead that can include a choke (e.g., a choke valve). For example, the well 1503 can include a choke valve to control various operations such as to reduce pressure of a fluid from high pressure in a closed wellbore to atmospheric pressure. A wellhead may include one or more sensors such as a temperature sensor, a pressure sensor, a solids sensor, etc. As an example, a wellhead can include a temperature sensor and a pressure sensor.

As to the ESP 1510, it is shown as including cables 1511 (e.g., or a cable), a pump 1512, gas handling features 1513, a pump intake 1514, a motor 1515, one or more sensors 1516 (e.g., temperature, pressure, strain, current leakage, vibration, etc.) and a protector 1517.

As an example, an ESP may include a REDA™ HOTLINE™ high-temperature ESP motor. Such a motor may be suitable for implementation in a thermal recovery heavy oil production system, such as, for example, SAGD system or other steam-flooding system.

As an example, an ESP motor can include a three-phase squirrel cage with two-pole induction. As an example, an ESP motor may include steel stator laminations that can help focus magnetic forces on rotors, for example, to help reduce energy loss. As an example, stator windings can include copper and insulation.

As an example, the one or more sensors 1516 of the ESP 1510 may be part of a digital downhole monitoring system. For example, consider the PHOENIX™ MULTISENSOR XT150 system (Schlumberger Limited, Houston, Texas). A monitoring system may include a base unit that operatively couples to an ESP motor (see, e.g., the motor 1515), for example, directly, via a motor-base crossover, etc. As an example, such a base unit (e.g., base gauge) may measure intake pressure, intake temperature, motor oil temperature, motor winding temperature, vibration, currently leakage, etc. As an example, a base unit may transmit information via a power cable that provides power to an ESP motor and may receive power via such a cable as well.

As an example, a remote unit may be provided that may be located at a pump discharge (e.g., located at an end opposite the pump intake 1514). As an example, a base unit and a remote unit may, in combination, measure intake and discharge pressures across a pump (see, e.g., the pump 1512), for example, for analysis of a pump curve. As an example, alarms may be set for one or more parameters (e.g., measurements, parameters based on measurements, etc.).

Where a system includes a base unit and a remote unit, such as those of the PHOENIX™ MULTISENSOR XT150 system, the units may be linked via wires. Such an arrangement provide power from the base unit to the remote unit and allows for communication between the base unit and the remote unit (e.g., at least transmission of information from the remote unit to the base unit). As an example, a remote unit is powered via a wired interface to a base unit such that one or more sensors of the remote unit can sense physical phenomena. In such an example, the remote unit can then transmit sensed information to the base unit, which, in turn, may transmit such information to a surface unit via a power cable configured to provide power to an ESP motor.

In the example of FIG. 15, the well 1503 may include one or more well sensors 1520, for example, such as the OPTI-CLINE™ sensors or WELLWATCHER BRITEBLUE™ sensors (Schlumberger Limited, Houston, Texas). Such sensors are fiber-optic based and can provide for real time sensing of temperature, for example, in SAGD or other operations. As shown in the example of FIG. 1, a well can include a relatively horizontal portion. Such a portion may collect heated heavy oil responsive to steam injection. Measurements of temperature along the length of the well can provide for feedback, for example, to understand conditions downhole of an ESP. Well sensors may extend a considerable distance into a well and possibly beyond a position of an ESP.

In the example of FIG. 15, the controller 1530 can include one or more interfaces, for example, for receipt, transmission or receipt and transmission of information with the motor controller 1550, a VSD unit 1570, the power supply 1505 (e.g., a gas fueled turbine generator, a power company, etc.), the network 1501, equipment in the well 1503, equipment in another well, etc.

As shown in FIG. 15, the controller 1530 may include or provide access to one or more frameworks, applications, etc. As an example, the controller 1530 can include one or more features of the EF 610 of FIG. 6, the EF 790 of FIG. 7, the EA 770-1, 770-2, 770-3 of FIG. 7, the EF 810 of FIG. 8, etc. As an example, the controller 1530 may be part of the VSD unit 1570.

As an example, the controller 1530 may include features of an ESP motor controller and optionally supplant the ESP motor controller 1550. For example, the controller 1530 may include features of the INSTRUCT™ motor controller (Schlumberger Limited, Houston, Texas) and/or features of the UNICONN™ motor controller (Schlumberger Limited, Houston, Texas).

In the example of FIG. 15, the motor controller 1550 may be a motor controller such as the UNICONN™ motor controller or the INSTRUCT™ motor controller. The UNICONN™ motor controller and/or the INSTRUCT™ motor controller can connect to a SCADA system, the ESP-WATCHER™ surveillance system (Schlumberger Limited, Houston, Texas), the LIFTWATCHER™ system (Schlumberger Limited, Houston, Texas), LIFTIQ™ system (Schlumberger Limited, Houston, Texas), etc. The UNICONN™ motor controller and/or the INSTRUCT™ motor controller can perform some control and data acquisition tasks for ESPs, surface pumps or other monitored wells. As an example, the UNICONN™ motor controller and/or the INSTRUCT™ motor controller can interface with the aforementioned PHOENIX™ monitoring system, for example, to access pressure, temperature and vibration data and various protection parameters as well as to provide direct current power to downhole sensors. The UNICONN™ motor controller and/or the INSTRUCT™ motor controller can interface with fixed speed drive (FSD) controllers or a VSD unit, for example, such as the VSD unit 1570.

For FSD controllers, the UNICONN™ motor controller and/or the INSTRUCT™ motor controller can monitor ESP system three-phase currents, three-phase surface voltage, supply voltage and frequency, ESP spinning frequency and leg ground, power factor and motor load.

For VSD units, the UNICONN™ motor controller and/or the INSTRUCT™ motor controller can monitor VSD output current, ESP running current, VSD output voltage, supply voltage, VSD input and VSD output power, VSD output frequency, drive loading, motor load, three-phase ESP running current, three-phase VSD input or output voltage, ESP spinning frequency, and leg-ground.

In the example of FIG. 15, the ESP motor controller 1550 includes various modules to handle, for example, backspin of an ESP, sanding of an ESP, flux of an ESP and gas lock of an ESP. The motor controller 1550 may include any of a variety of features, additionally, alternatively, etc.

In the example of FIG. 15, the VSD unit 1570 may be a low voltage drive (LVD) unit, a medium voltage drive (MVD) unit or other type of unit (e.g., a high voltage drive, which may provide a voltage in excess of about 4.16 kV). As an example, the VSD unit 1570 may receive power with a voltage of about 4.16 kV and control a motor as a load with a voltage from about 0 V to about 4.16 kV. The VSD unit 1570 may include control circuitry such as the SPEEDSTAR™ MVD control circuitry (Schlumberger Limited, Houston, Texas).

Figure 16:
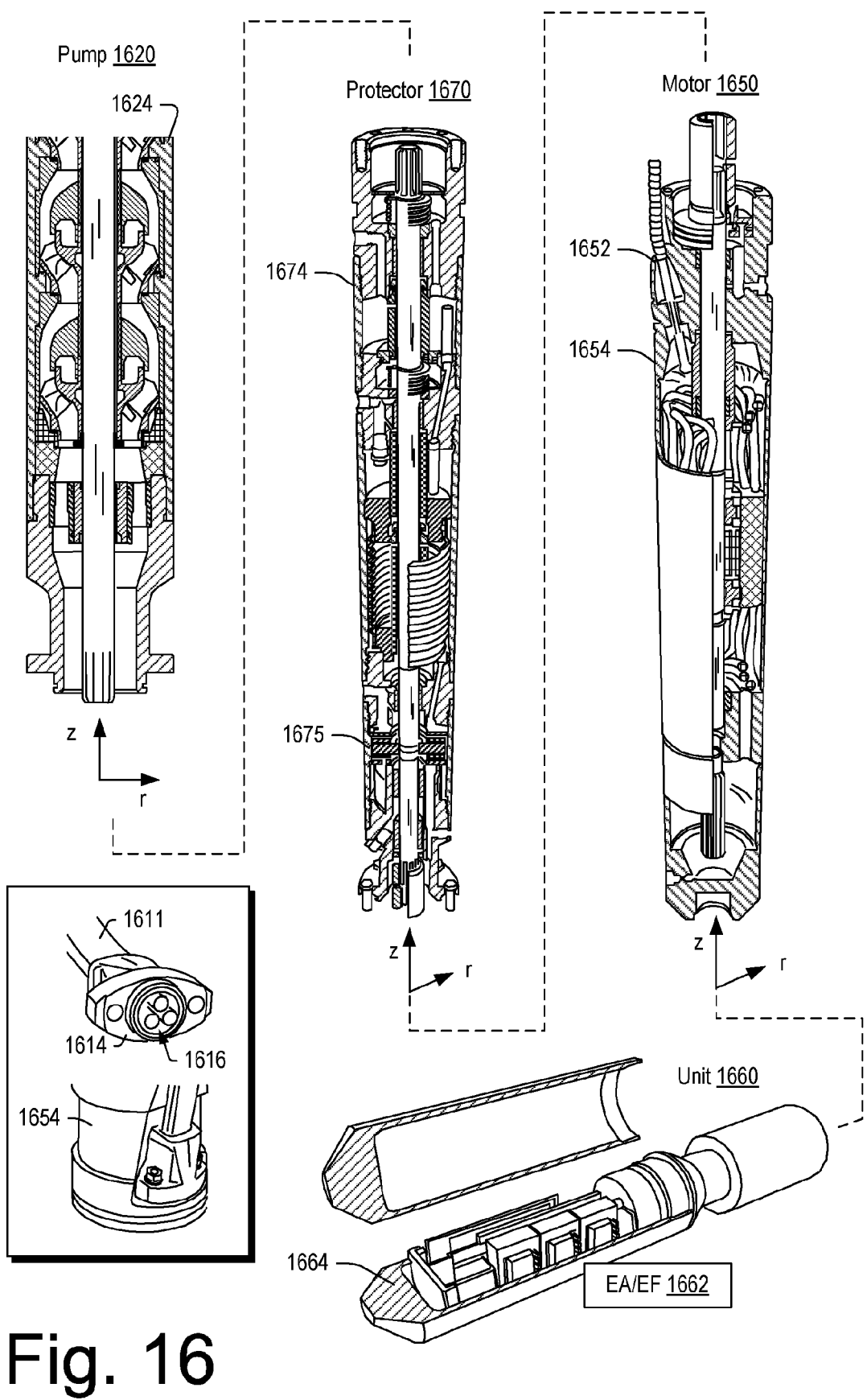
FIG. 16 illustrates examples of ESP components.

FIG. 16 shows cut-away views of examples of equipment such as, for example, a portion of a pump 1620, a protector 1670, a motor 1650 of an ESP and a sensor unit 1660 that can include an edge application (EA) and/or an edge framework (EF) 1662. Where the sensor unit 1660 includes an EA and/or an EF 1662, the sensor unit 1660 may provide for control of one or more features of an ESP system such as the ESP system 1500 of FIG. 15. Where an EA and/or an EF is located in a sensor unit acquisition of sensor data may optionally be controlled and/or expeditious (e.g., due to proximity, common circuitry, etc.). As an example, an ESP controller (e.g., a VSD, etc.) can include transmission circuitry that can transmit or download information to a sensor unit. For example, consider downloading a container or containers to a sensor unit before deployment, during deployment and/or during operation of an ESP (e.g., operation of a motor that drives a pump of the ESP, etc.).

In the examples of FIG. 16, each of the pieces of equipment may be considered to be assemblies that, for example, can be operatively coupled to form a system (e.g., an ESP or ESP system). In FIG. 16, the pump 1620, the protector 1670, the motor 1650 and the sensor unit 1660 are shown with respect to cylindrical coordinate systems (e.g., r, z, Θ). Various features of equipment may be described, defined, etc. with respect to a cylindrical coordinate system. As an example, a lower end of the pump 1620 may be coupled to an upper end of the protector 1670, a lower end of the protector 1670 may be coupled to an upper end of the motor 1650 and a lower end of the motor 1650 may be coupled to an upper end of the sensor unit 1660 (e.g., via a bridge or other suitable coupling).

As shown in FIG. 16, a shaft segment of the pump 1620 may be coupled via a connector to a shaft segment of the protector 1670 and the shaft segment of the protector 1670 may be coupled via a connector to a shaft segment of the motor 1650. As an example, an ESP may be oriented in a desired direction, which may be vertical, horizontal, or other angle (e.g., as may be defined with respect to gravity, etc.). Orientation of an ESP with respect to gravity may be considered as a factor, for example, to determine ESP features, operation, etc.

As shown in FIG. 16, the motor 1650 is an electric motor that includes a connector 1652, for example, to operatively couple the electric motor to a multiphase power cable, for example, optionally via one or more motor lead extensions. Power supplied to the motor 1650 via the connector 1652 may be further supplied to the sensor unit 1660, for example, via a wye point of the motor 1650 (e.g., a wye point of a multiphase motor).

As an example, a connector may include features to connect one or more transmission lines, optionally dedicated to a monitoring system. For example, the connector 1652 may include a socket, a pin, etc., that can couple to a transmission line dedicated to the sensor unit 1660. As an example, the sensor unit 1660 can include a connector that can connect the sensor unit 1660 to a dedicated transmission line or lines, for example, directly and/or indirectly.

As an example, the motor 1650 may include a transmission line jumper that extends from the connector 1652 to a connector that can couple to the sensor unit 1660. Such a transmission line jumper may be, for example, one or more conductors, twisted conductors, an optical fiber, optical fibers, a waveguide, waveguides, etc. As an example, the motor 1650 may include a high-temperature optical material that can transmit information. In such an example, the optical material may couple to one or more optical transmission lines and/or to one or more electrical-to-optical and/or optical-to-electrical signal converters.

In the examples of FIG. 16, one or more coated electrical conductors may be present. For example, the pump 1620 may include one or more coated electrical conductors operatively coupled to and/or part of sensor circuitry and/or another type of circuitry; the protector 1670 may include one or more coated electrical conductors operatively coupled to and/or part of sensor circuitry and/or another type of circuitry; the motor 1650 may include one or more coated electrical conductors operatively coupled to and/or part of sensor circuitry, electric motor circuitry and/or another type of circuitry; and the unit 1660 may include one or more coated electrical conductors operatively coupled to and/or part of sensor circuitry and/or another type of circuitry.

In the examples of FIG. 16, the pump 1620 can include a housing 1624, the protector 1670 can include a housing 1674, the motor 1650 can include a housing 1654 and the unit 1660 can include a housing 1664. In such examples, a housing can include opposing ends, a longitudinal axis, an axial length defined between the opposing ends, a maximum transverse dimension that is less than the length and an interior space. As an example, circuitry may be disposed at least in part in the interior space. As an example, a coated electrical conductor can be electrically coupled to such circuitry where the coated electrical conductor includes an electrical conductor that includes copper and a length defined by opposing ends, a polymeric electrical insulation layer disposed about at least a portion of the length of the electrical conductor, and a barrier layer disposed about at least a portion of the polymeric electrical insulation layer.

As to the pump 1620, the motor 1650, the unit 1660 and the protector 1670 of FIG. 16, these may be individual assemblies that include a coated electrical conductor electrically coupled to circuitry where the coated electrical conductor includes an electrical conductor that includes copper and a length defined by opposing ends, a polymeric electrical insulation layer disposed about at least a portion of the length of the electrical conductor, and a barrier layer disposed about at least a portion of the polymeric electrical insulation layer. As an example, one or more of such assemblies can include one or more sealed interior spaces, for example, consider a housing that includes one or more seal elements, one or more joints, etc. that aim to protect circuitry, etc., in the interior space or spaces from fluid in a downhole environment. As an example, an assembly can include an encapsulant or encapsulating material in an interior space. As an example, an assembly can include a specialized fluid in an interior space (e.g., a dielectric oil, etc.).

As an example, where water and/or gas (e.g., $CO_2$, $H_2S$) penetrates a housing and enters an interior space, a coated electrical conductor can include an electrical conductor that includes copper and a length defined by opposing ends, a polymeric electrical insulation layer disposed about at least a portion of the length of the electrical conductor, and a barrier layer disposed about at least a portion of the polymeric electrical insulation layer where the barrier layer acts to protect the polymeric electrical insulation layer from the water and/or gas. In such an example, the barrier layer may prolong the useful life (e.g., operational life) of an assembly.

Figure 17:
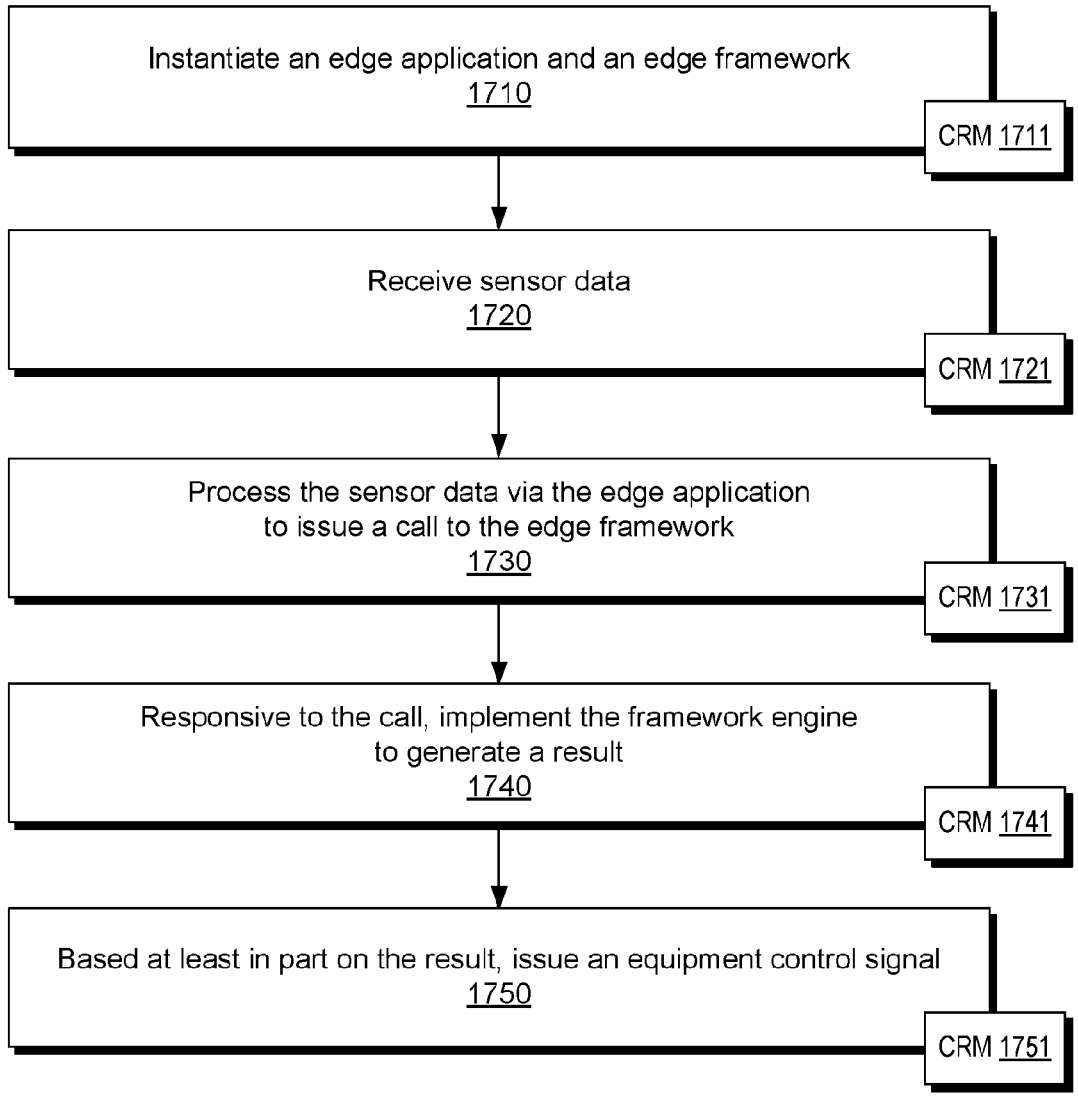
FIG. 17 illustrates an example of a method and an example of a system.

FIG. 17 shows an example of a method 1700 that includes an instantiation block 1710 for instantiating an edge application and an edge framework, where the edge framework includes a framework engine; a reception block 1720 for receiving sensor data; a process block 1730 for processing the sensor data via the edge application to issue a call to the edge framework; an implementation block 1740 for, responsive to the call, implementing the edge framework engine to generate a result; and an issuance block 1750 for, based at least in part on the result, issuing an equipment control signal.

The method 1700 is shown in FIG. 17 in association with various computer-readable media (CRM) blocks 1711, 1721, 1731, 1741 and 1751. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1700. As an example, a computer-readable medium (CRM) may be a computer-readable storage medium that is non-transitory and that is not a carrier wave. As an example, one or more of the blocks 1711, 1721, 1731, 1741 and 1751 may be in the form of processor-executable instructions, for example, consider the one or more sets of instructions 270 of the system 250 of FIG. 2, etc.

In the example of FIG. 17, the system 1790 includes one or more information storage devices 1791, one or more computers 1792, one or more networks 1795 and instructions 1796. As to the one or more computers 1792, each computer may include one or more processors (e.g., or processing cores) 1793 and memory 1794 for storing the instructions 1796, for example, executable by at least one of the one or more processors 1793 (see, e.g., the blocks 1711, 1721, 1731, 1741 and 1751). As an example, a computer may include one or more network interfaces (e.g., wired or wireless), one or more graphics cards, a display interface (e.g., wired or wireless), etc.

As an example, an equipment controller can include a processor; memory accessible to the processor; and processor-executable instructions stored in the memory to instruct the equipment controller to: instantiate an edge application and an edge framework, where the edge framework includes a framework engine; receive sensor data; process the sensor data via the edge application to issue a call to the edge framework; responsive to the call, implement the framework engine to generate a result; and, based at least in part on the result, issue an equipment control signal. In such an example, the equipment controller can be part of an electric submersible pump system or, for example, another equipment system or piece of equipment.

As an example, an equipment controller can be part of or operatively coupled to a variable speed drive (VSD) unit of an electric submersible pump system.

As an example, an equipment controller can be operatively coupled to an electric submersible pump gauge that includes at least one sensor. For example, consider a gauge that mounts to a distal end of an ESP where the gauge can be exposed to flow driven by a pump of the ESP that may be operated in an intended direction of flow (e.g., generally along an axis of the pump). In such an example, the gauge can be exposed to fluid that is pumped and/or fluid that is to be pumped; noting that fluid may include entrained material such as sand, etc.

As an example, an equipment controller can be operatively coupled to wellhead equipment that includes at least one sensor. For example, consider a wellhead that includes a temperature sensor and a pressure sensor.

As an example, an equipment controller may make and/or respond to calls. For example, consider a call that is an application programming interface (API) call. An API may be a specification that is implemented in the form of hardware or hardware and software (e.g., executable instructions).

As an example, an equipment controller can include processor-executable instructions stored in memory to instruct the equipment controller to instantiate a plurality of edge applications. As an example, consider a scenario where at least one of the plurality of edge applications is instantiated via another, different processor. As explained, a site may include a plurality of edge applications (EAs), which may be networked or otherwise capable of transmitting information and/or receiving information in a local environment for purposes of equipment control.

As an example, an equipment controller can generate a result that is a fluid flow value. In such an example, the fluid flow value may be a virtual fluid flow value that is a proxy for what may be measured by a fluid flow meter, which may or may not be present. In various examples, an equipment controller may utilize one or more simulators to generate a simulation result or results that can indicate a value of fluid flow (e.g., a fluid flow rate, etc.). Such an approach may provide for fluid flow-based control operations where, for example, an actual fluid flow meter is not present. As an example, where a network exists, multiple instances of edge applications may generate fluid flow values where at least one may be at, before or after a header (e.g., a manifold). In such an example, a summation and/or subtraction may be performed as a sanity check to, for example, calibrate and/or call for calibration of one or more of the edge applications and/or a simulator or simulators.

As an example, a result can include a fluid flow rate for a first fluid phase and a fluid flow rate for a second fluid phase. As an example, a result may indicate a transition such as a phase transition in flowing fluid.

As an example, a framework engine can include a fluid flow simulator. As an example, a framework engine can include a black oil model simulator. As an example, a framework engine can include a steady state simulator and/or a dynamic simulator.

As an example, a result can be or include a production index (PI) result. A PI result can be associated with flow from a well such as a production metric of the well. As an example, where production is not optimal, an equipment controller may act to implement one or more control actions to help optimize production, which may be reflected in a production index and/or one or more other metrics, sensor values, etc. As explained, an equipment controller may include an ability to generate fluid flow values where a fluid flow meter is not present and, for example, optimize fluid flow via one or more control actions as to equipment. As an example, such a system may operate in a stand-alone manner, which may be suitable for a remote location where resources such as communication networks, people, transport, etc., may be lacking and/or otherwise problematic and/or costly.

As explained, where satellite communication is available at a remote site without other types of electronic communication to the remote site, a local stand-alone controller can prove beneficial.

As an example, an equipment controller can include generating a result such as an emulsion result, a corrosion result, a sand result, etc. Such types of results can be utilized for one or more purposes. For example, consider triggering injection of a chemical to break an emulsion, a chemical to reduce corrosion, etc. As to sand, consider altering operation of an artificial lift technique to reduce one or more sand issues. For example, consider operating an ESP at a different flow rate such that flow may be adequate with less sand entrainment and/or wear due to sand abrasion, etc.

As an example, an equipment controller can include a satellite communication interface. As an example, an equipment controller can include a socket for a media drive. As an example, an equipment controller can include one or more features for operation with a drone. As explained, information may be delivered via a drone, an airplane, etc., where the information may be dropped or, for example, in the case of a drone, navigated to proximity to an equipment controller or equipment associated therewith. As an example, a site may include one or more drones that can pick-up and transport air dropped information (e.g., a media drive, etc.). In various instances, instructions, data, etc., may arrive at a site where the instructions, data, etc., can be loaded to a local equipment controller for one or more purposes, which may include for purposes of instantiating an edge application and/or an edge framework.

As an example, a method can include instantiating an edge application and an edge framework, where the edge framework includes a framework engine; receiving sensor data; processing the sensor data via the application to issue a call to the framework; responsive to the call, implementing the framework engine to generate a result; and, based at least in part on the result, issuing an equipment control signal.

As an example, one or more computer-readable storage media can include processor-executable instructions to instruct a computing system to: instantiate an edge application and an edge framework, where the edge framework includes a framework engine; receive sensor data; process the sensor data via the application to issue a call to the framework; responsive to the call, implement the framework engine to generate a result; and, based at least in part on the result, issue an equipment control signal.

As an example, a computer program product can include computer-executable instructions to instruct a computing system to perform one or more methods such as, for example, the method 1700 of FIG. 17, etc.

As an example, a computer program product can include one or more computer-readable storage media that can include processor-executable instructions to instruct a computing system to perform one or more methods and/or one or more portions of a method.

Figure 18:
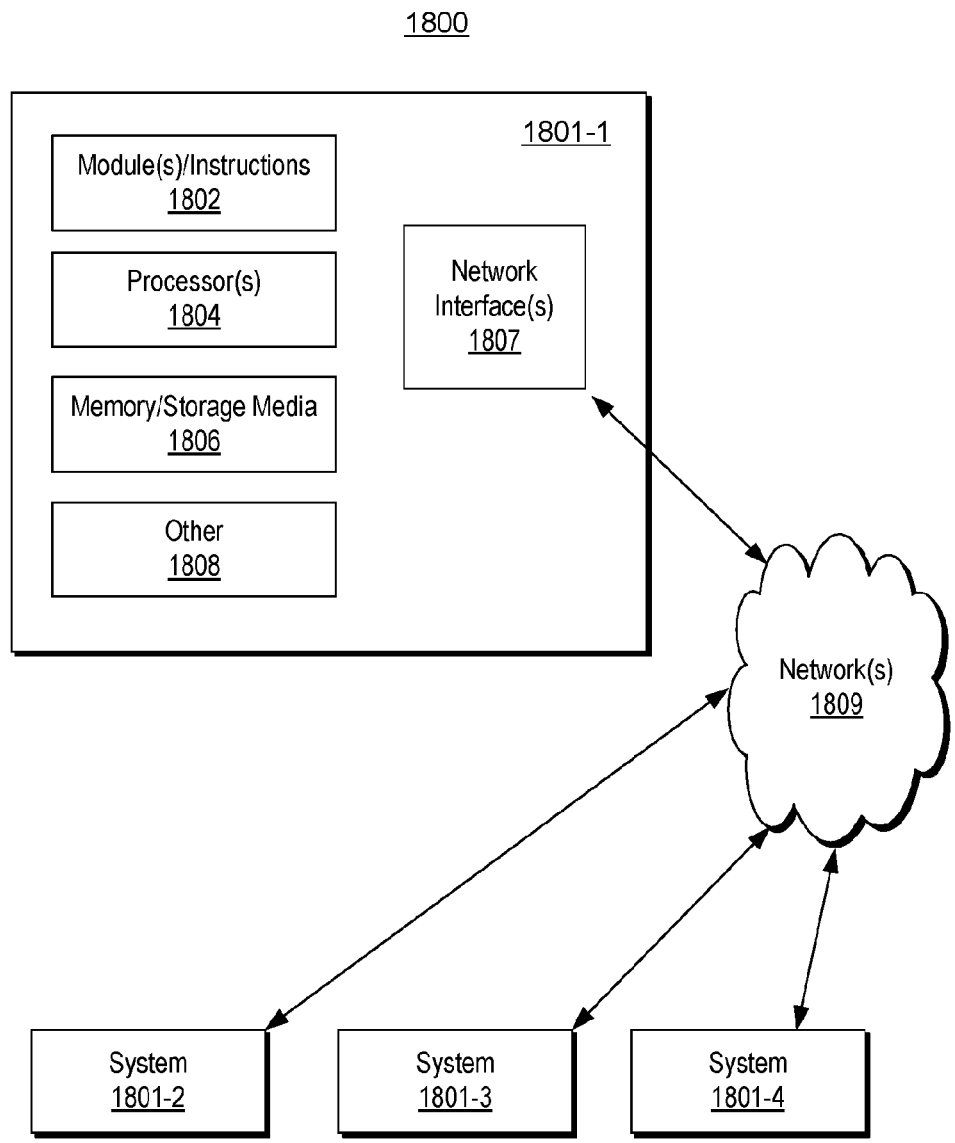
FIG. 18 illustrates examples of computer and network equipment.

In some embodiments, a method or methods may be executed by a computing system. FIG. 18 shows an example of a system 1800 that can include one or more computing systems 1801-1, 1801-2, 1801-3 and 1801-4, which may be operatively coupled via one or more networks 1809, which may include wired and/or wireless networks.

As an example, a system can include an individual computer system or an arrangement of distributed computer systems. In the example of FIG. 18, the computer system 1801-1 can include one or more modules 1802, which may be or include processor-executable instructions, for example, executable to perform various tasks (e.g., receiving information, requesting information, processing information, simulation, outputting information, etc.).

As an example, a module may be executed independently, or in coordination with, one or more processors 1804, which is (or are) operatively coupled to one or more storage media 1806 (e.g., via wire, wirelessly, etc.). As an example, one or more of the one or more processors 1804 can be operatively coupled to at least one of one or more network interface 1807. In such an example, the computer system 1801-1 can transmit and/or receive information, for example, via the one or more networks 1809 (e.g., consider one or more of the Internet, a private network, a cellular network, a satellite network, etc.).

As an example, the computer system 1801-1 may receive from and/or transmit information to one or more other devices, which may be or include, for example, one or more of the computer systems 1801-2, etc. A device may be located in a physical location that differs from that of the computer system 1801-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 1806 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general-purpose processors or application specific chips (e.g., or chipsets), such as ASICs, FPGAs, PLDs, or other appropriate devices.

Figure 19:
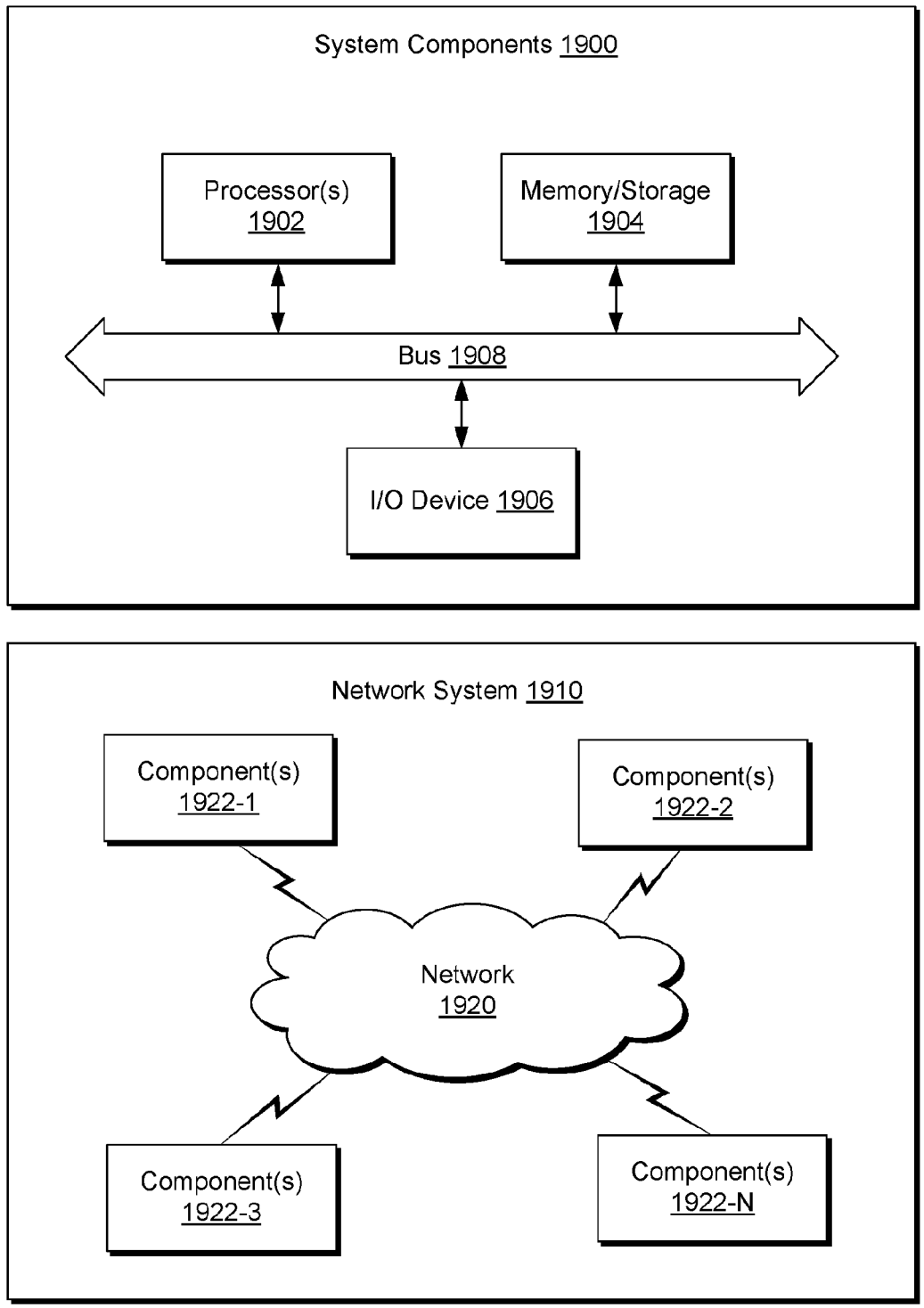
FIG. 19 illustrates example components of a system and a networked system.

FIG. 19 shows components of an example of a computing system 1900 and an example of a networked system 1910 with a network 1920. The system 1900 includes one or more processors 1902, memory and/or storage components 1904, one or more input and/or output devices 1906 and a bus 1908. In an example embodiment, instructions may be stored in one or more computer-readable media (e.g., memory/storage components 1904). Such instructions may be read by one or more processors (e.g., the processor(s) 1902) via a communication bus (e.g., the bus 1908), which may be wired or wireless. The one or more processors may execute such instructions to implement (wholly or in part) one or more attributes (e.g., as part of a method). A user may view output from and interact with a process via an I/O device (e.g., the device 1906). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 1910. The network system 1910 includes components 1922-1, 1922-2, 1922-3, . . . 1922-N. For example, the components 1922-1 may include the processor(s) 1902 while the component(s) 1922-3 may include memory accessible by the processor(s) 1902. Further, the component(s) 1922-2 may include an I/O device for display and optionally interaction with a method. The network 1920 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An equipment controller comprising:
a processor,
memory accessible to the processor; and
processor-executable instructions stored in the memory to instruct the equipment controller to:
  instantiate, at a local controller for wellhead equipment, an edge application;
  instantiate, at a gateway computing device, an edge framework, wherein the edge framework comprises a framework engine, wherein the framework engine includes a local instance of a physics model for running a simulation of an oil and gas process performed by the wellhead equipment;
  receive, via the edge application and over a local network, sensor data;
  process the sensor data via the edge application to issue, from the edge application over the local network to the gateway computing device, a call to the edge framework, wherein processing the sensor data includes generating a request for the simulation from the physics model, the call including the request;
  responsive to the call, implement the framework engine to run the simulation using the sensor data, the simulation generating a result related to the oil and gas process; and
  based at least in part on the result, issue, from the framework engine over the local network to the local controller, an equipment control signal to adjust operation of the wellhead equipment performing the oil and gas process.

2. The equipment controller of claim 1, wherein the equipment controller is part of an electric submersible pump system.

3. The equipment controller of claim 1, wherein the equipment controller is operatively coupled to a variable speed drive (VSD) unit of an electric submersible pump system.

4. The equipment controller of claim 1, wherein the equipment controller is operatively coupled to an electric submersible pump gauge that comprises at least one sensor.

5. The equipment controller of claim 1, wherein the equipment controller is operatively coupled to the wellhead equipment that comprises at least one sensor.

6. The equipment controller of claim 5, wherein the at least one sensor comprises a temperature sensor and a pressure sensor.

7. The equipment controller of claim 1, wherein the call comprises an application programming interface (API) call.

8. The equipment controller of claim 1, wherein the wellhead equipment includes a plurality of units of equipment, and further comprising processor-executable instructions stored in the memory to instruct the equipment controller to instantiate a plurality of edge applications at the plurality of units of equipment.

9. The equipment controller of claim 8, wherein at least one of the plurality of edge applications is instantiated via another, different processor.

10. The equipment controller of claim 1, wherein the result is a fluid flow value.

11. The equipment controller of claim 1, wherein the result comprises a fluid flow rate for a first fluid phase and a fluid flow rate for a second fluid phase.

12. The equipment controller of claim 1, wherein the framework engine comprises a fluid flow simulator.

13. The equipment controller of claim 1, wherein the framework engine comprises a black oil model simulator.

14. The equipment controller of claim 1, wherein the result comprises a production index (PI) result.

15. The equipment controller of claim 1, wherein the result comprises an emulsion result.

16. The equipment controller of claim 1, wherein the result comprises a corrosion result.

17. The equipment controller of claim 1, wherein the result comprises a sand result.

18. The equipment controller of claim 1, comprising a satellite communication interface.

19. A method comprising:
instantiating, at a local controller for wellhead equipment, an edge application;
instantiating, at a gateway computing device, an edge framework, wherein the edge framework comprises a framework engine, wherein the framework engine includes a local instance of a physics model for running a simulation of an oil and gas process performed by the wellhead equipment;
receiving, via the edge application and over a local network, sensor data;
processing the sensor data via the edge application to issue, from the edge application over the local network to the gateway computing device, a call to the edge framework, wherein processing the sensor data includes generating a request for the simulation from the physics model, the call including the request;
responsive to the call, implementing the framework engine to run the simulation using the sensor data, the simulation generating a result related to the oil and gas process; and
based at least in part on the result, issuing, from the framework engine over the local network to the local controller, an equipment control signal to adjust operation of the wellhead equipment performing the oil and gas process.

20. One or more non-transitory signal computer-readable storage media comprising processor-executable instructions to instruct a computing system to:
instantiate, at a local controller for wellhead equipment, an edge application;
instantiate, at a gateway computing device, an edge framework, wherein the edge framework comprises a framework engine, wherein the framework engine includes a local instance of a physics model for running a simulation of an oil and gas process performed by the wellhead equipment;
receive, via the edge application and over a local network, sensor data;
process the sensor data via the edge application to issue, from the edge application over the local network to the gateway computing device, a call to the edge framework, wherein processing the sensor data includes generating a request for the simulation from the physics model, the call including the request;
responsive to the call, implement the framework engine to run the simulation using the sensor data, the simulation generating a result related to the oil and gas process; and
based at least in part on the result, issue, from the framework engine over the local network to the local controller, an equipment control signal to adjust operation of the wellhead equipment performing the oil and gas process.

* * * * *